United States Patent
Kitsutaka

(10) Patent No.: US 7,566,273 B2
(45) Date of Patent: Jul. 28, 2009

(54) GAME SYSTEM AND IMAGE GENERATING METHOD

(75) Inventor: Shigeru Kitsutaka, Kawasaki (JP)

(73) Assignee: Namco Bandai Games, Inc., Tokyo (JP)

( * ) Notice: Subject to any disclaimer, the term of this patent is extended or adjusted under 35 U.S.C. 154(b) by 1442 days.

(21) Appl. No.: 09/937,562

(22) PCT Filed: Jan. 23, 2001

(86) PCT No.: PCT/JP01/00409

§ 371 (c)(1),
(2), (4) Date: Oct. 15, 2001

(87) PCT Pub. No.: WO01/55970

PCT Pub. Date: Aug. 2, 2001

(65) Prior Publication Data

US 2002/0155888 A1  Oct. 24, 2002

(30) Foreign Application Priority Data

Jan. 28, 2000 (JP) ............................. 2000-020464
Jul. 14, 2000 (JP) ............................. 2000-214351

(51) Int. Cl.
G06T 15/50 (2006.01)
G06T 15/00 (2006.01)
G09G 5/02 (2006.01)
A63F 13/00 (2006.01)

(52) U.S. Cl. .......................... 463/30; 345/422; 345/419; 345/420; 345/592; 345/426; 463/31; 463/32; 463/33

(58) Field of Classification Search ......... 345/418–424, 345/426, 429–431, 592; 463/40–42, 30–35
See application file for complete search history.

(56) References Cited

U.S. PATENT DOCUMENTS 4,727,365 A * 2/1988 Bunker et al. ............... 345/427

(Continued)

FOREIGN PATENT DOCUMENTS

JP  A 7-239844  9/1995

(Continued)

OTHER PUBLICATIONS

U.S. Appl. No. 09/937,563, filed Oct. 18, 2001, Kitsutaka.

*Primary Examiner*—Peter DungBa Vo
*Assistant Examiner*—Frank M Leiva
(74) *Attorney, Agent, or Firm*—Oliff & Berridge, PLC

(57) ABSTRACT

An objective of the present invention is to provide a game system, program and image generating method which can generate a more realistic image with reduced processing load by using an alpha value set depending on a depth value. Z-value for each pixel in an original image is transformed into Z2-value that is formed of bits I to J which are positioned lower than the most significant bit in the Z-value. The alpha value for each pixel is set at a value corresponding to the Z2-value. Representation of the depth of field or fog image is enabled by using the alpha value to generate an image. The Z2-value is clamped to a given value depending on a bit value other than the bits I to J of the Z-value. Bits M to N and K to L (where $K \geq I \geq L > M \geq J \geq N$) in the Z-value are set as index numbers in LUT1 and LUT2 and used to perform texture mapping for transforming the Z-value into Z3- and Z4-values. These Z3- and Z4-values are used to determine the Z2-value.

33 Claims, 30 Drawing Sheets

U.S. PATENT DOCUMENTS

| | | | |
|---|---|---|---|
| 5,808,617 A * | 9/1998 | Kenworthy et al. | 345/421 |
| 5,835,096 A * | 11/1998 | Baldwin | 345/582 |
| 5,844,571 A * | 12/1998 | Narayanaswami | 345/422 |
| 6,057,851 A * | 5/2000 | Luken et al. | 345/586 |
| 6,289,138 B1 * | 9/2001 | Yip et al. | 382/307 |
| 6,311,258 B1 * | 10/2001 | Gibson et al. | 711/200 |
| 6,559,854 B2 * | 5/2003 | Oka et al. | 345/582 |
| 6,599,194 B1 * | 7/2003 | Smith et al. | 463/30 |
| 6,728,420 B2 * | 4/2004 | Tsunashima et al. | 382/282 |
| 2002/0057275 A1 * | 5/2002 | Parikh et al. | 345/522 |
| 2002/0180731 A1 * | 12/2002 | Lapidous et al. | 345/422 |

FOREIGN PATENT DOCUMENTS

JP  A 2000-132706  5/2000

* cited by examiner

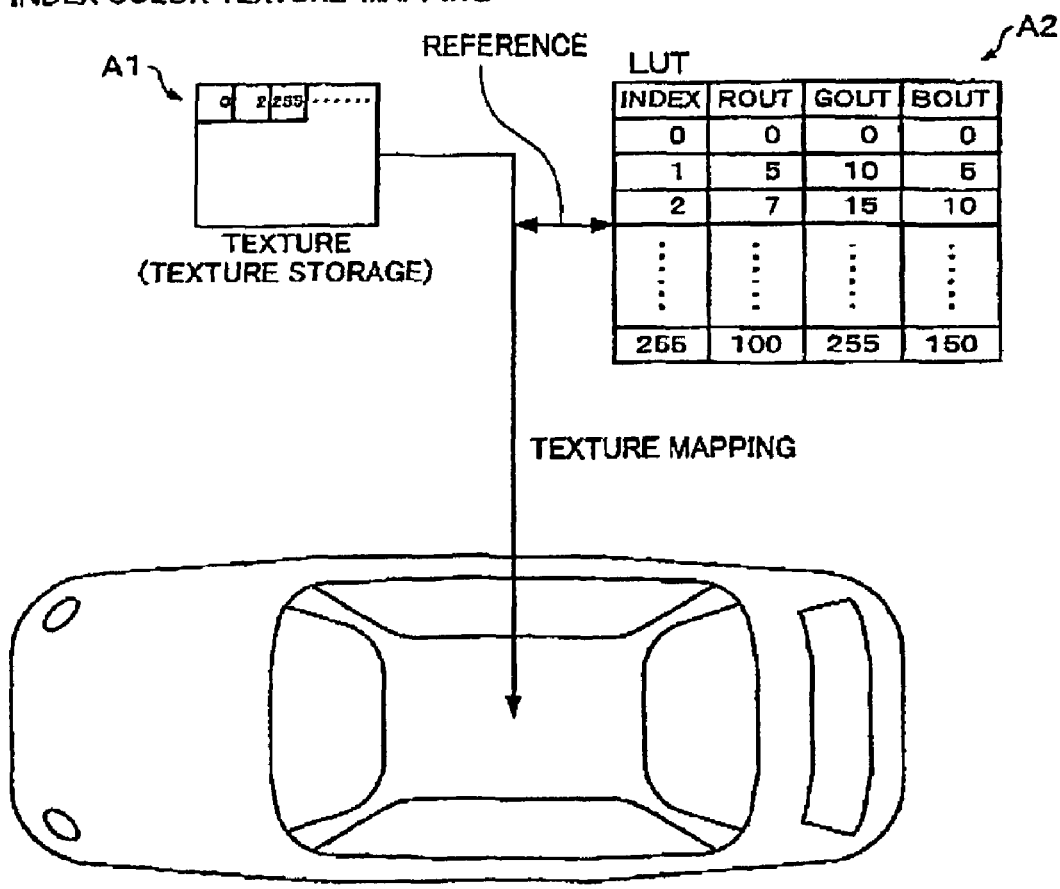

FIG. 11A  ORIGINAL IMAGE
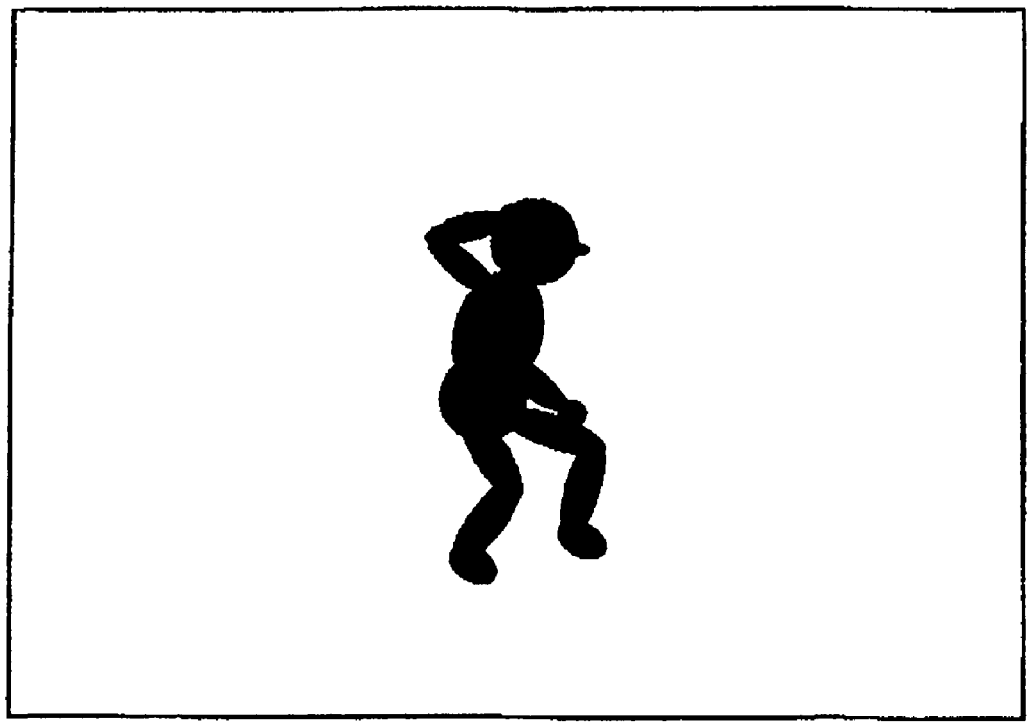
FIG. 11B  DEFOCUSED IMAGE
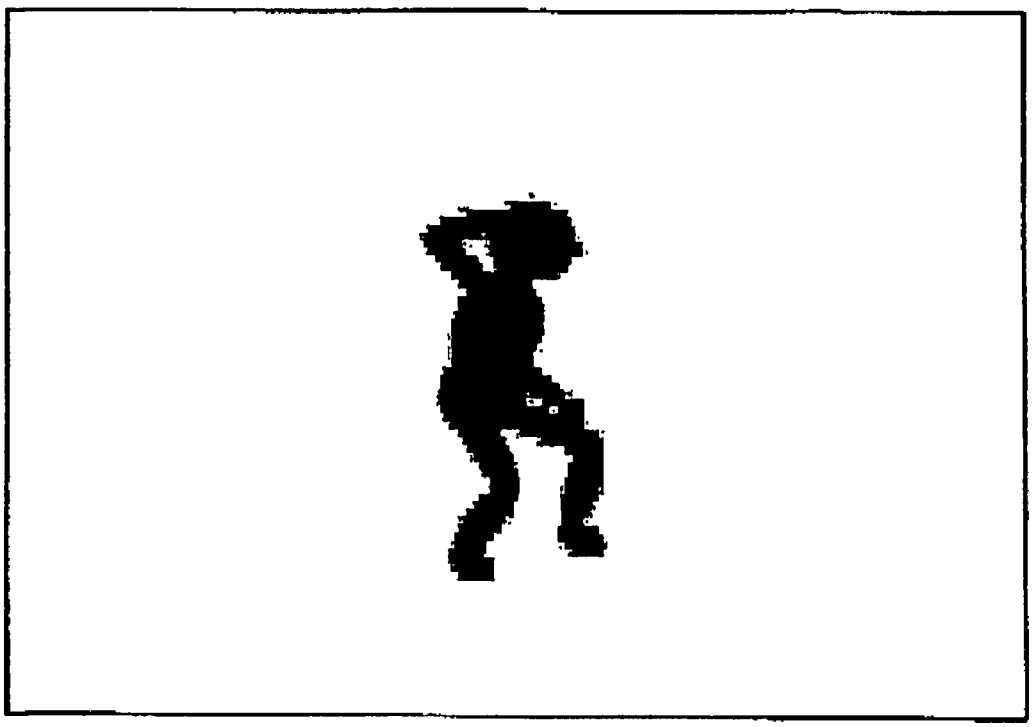

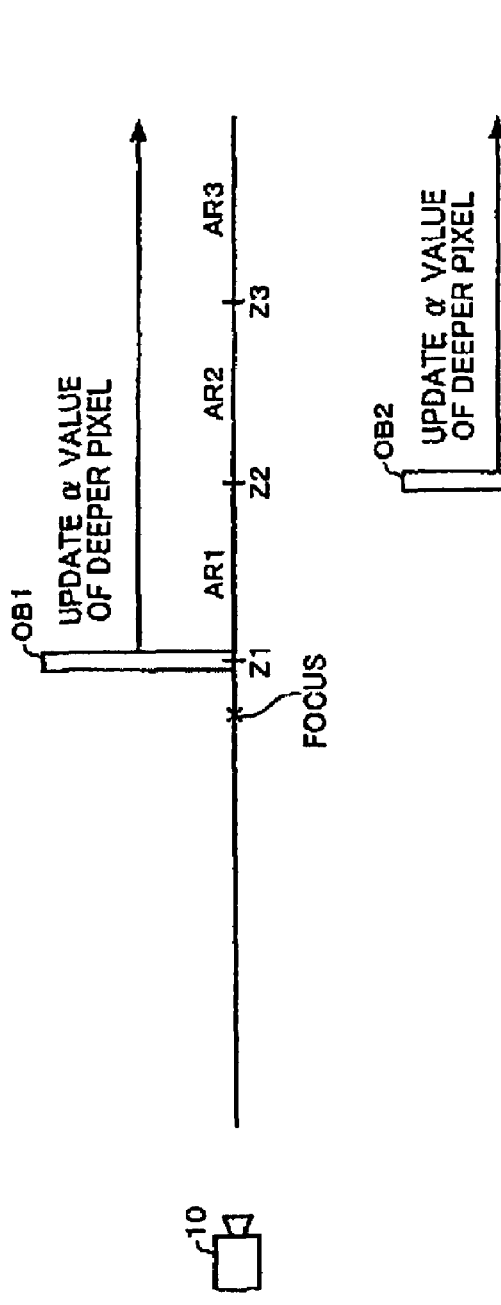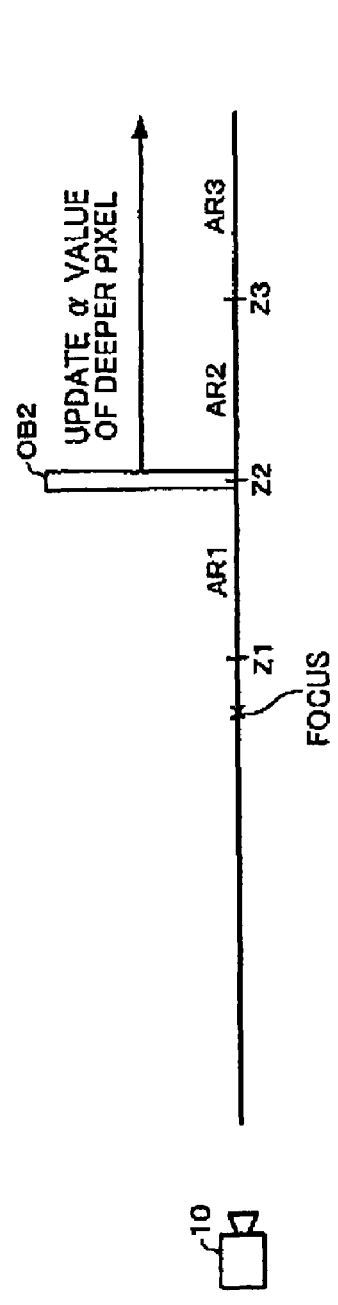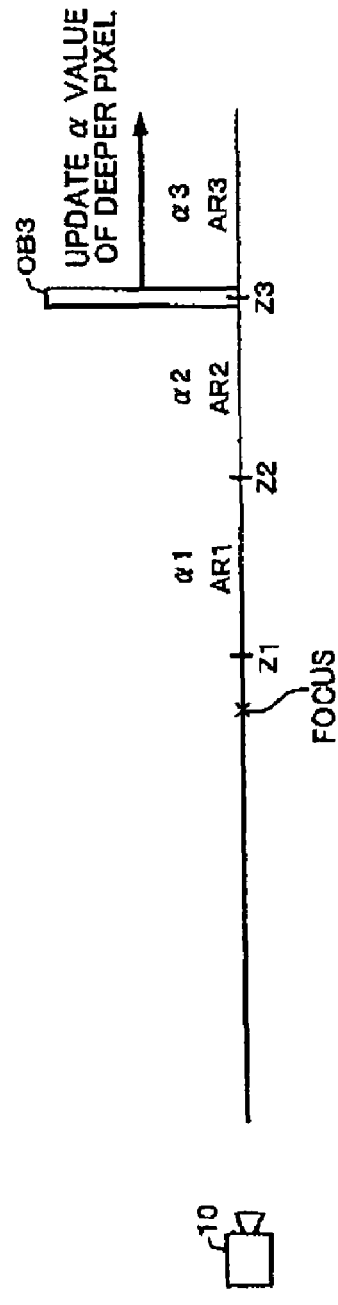

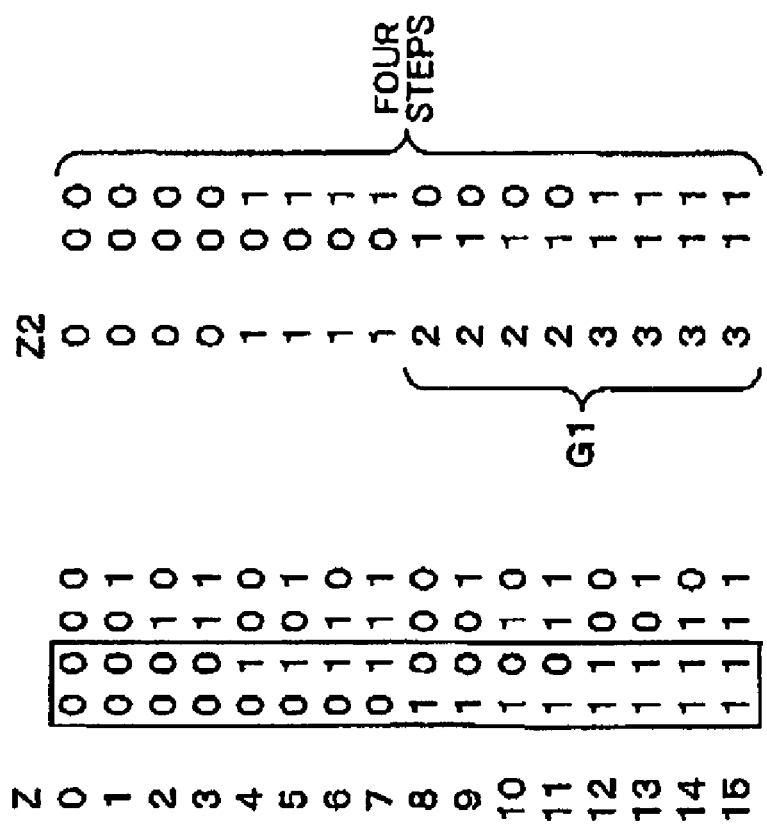
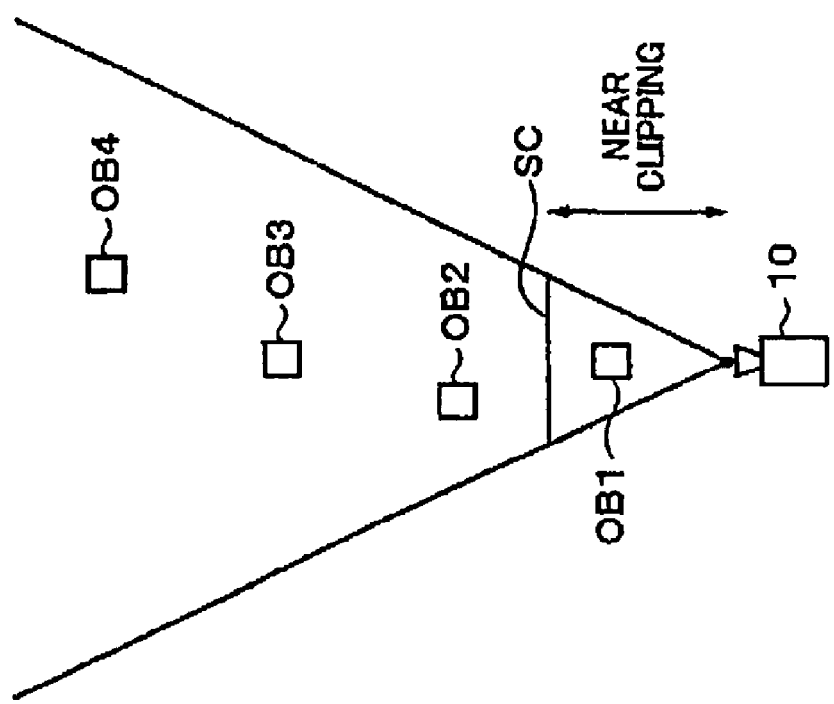
FIG. 15

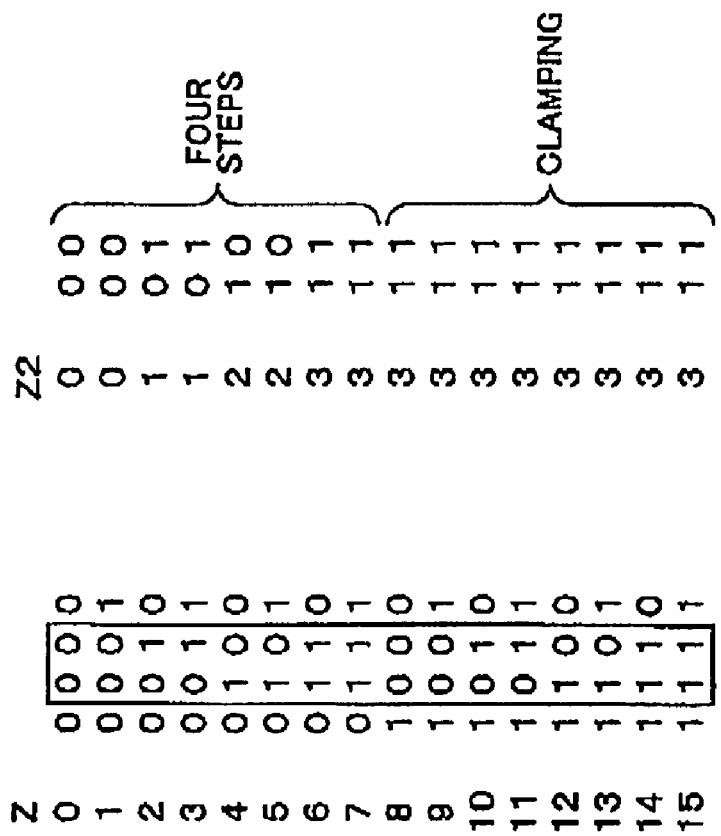
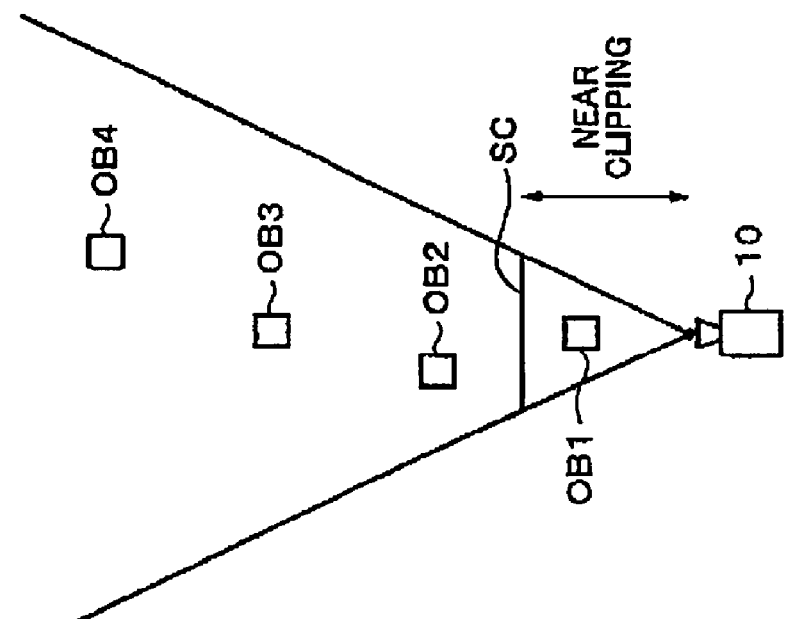
FIG. 16

FIG. 18

LUT1 (BITS 15 TO 8)

| INDEX | OUT (ANY ONE OF R, G, B AND α) |
|---|---|
| 0x00 (00000000) | 0x00 (00000000) |
| ⋮ | ⋮ |
| 0x0F (00001111) | 0x00 (00000000) |
| 0x10 (00010000) | 0x01 (00000001) |
| ⋮ | ⋮ |
| 0x1F (00011111) | 0x01 (00000001) |
| 0x20 (00100000) | 0x02 (00000010) |
| ⋮ | ⋮ |
| 0x2F (00101111) | 0x02 (00000010) |
| 0x30 (00110000) | 0x03 (00000011) |
| ⋮ | ⋮ |
| 0xE0 (11100000) | 0x0E (00001110) |
| ⋮ | ⋮ |
| 0xEF (11101111) | 0x0E (00001110) |
| 0xF0 (11110000) | 0x0F (00001111) |
| 0xF1 (11110001) | 0x0F (00001111) |
| 0xF2 (11110010) | 0x0F (00001111) |
| ⋮ | ⋮ |
| 0xFF (11111111) | 0x0F (00001111) |

FIG. 19

LUT2 (BITS 23 TO 16)

| INDEX | OUT (ANY ONE OF R, G, B AND α) |
|---|---|
| 0x00 (00000000) | 0x00 (00000000) |
| 0x01 (00000001) | 0x10 (00010000) |
| 0x02 (00000010) | 0x20 (00100000) |
| 0x03 (00000011) | 0x30 (00110000) |
| 0x04 (00000100) | 0x40 (01000000) |
| ⋮ | ⋮ |
| 0x0E (00001110) | 0xE0 (11100000) |
| 0x0F (00001111) | 0xF0 (11110000) |
| 0x10 (00010000) | 0xF0 (11110000) |
| 0x11 (00010001) | 0xF0 (11110000) |
| ⋮ | ⋮ |
| 0xFF (11111111) | 0xF0 (11110000) |

Q1

CLAMPING

LUT3

| INDEX | OUT($\alpha$) |
|---|---|
| 0x00 (00000000) | 0xFF (11111111) |
| 0x01 (00000001) | 0xFE (11111110) |
| 0x02 (00000010) | 0xFB (11111011) |
| ⋮ | ⋮ |
| 0x7F (01111111) | 0x00 (00000000) |
| 0x80 (10000000) | 0x00 (00000000) |
| 0x81 (10000001) | 0x00 (00000000) |
| ⋮ | ⋮ |
| 0xFE (11111110) | 0xFE (11111110) |
| 0xFF (11111111) | 0xFF (11111111) |

|   |   |   |   |   |
|---|---|---|---|---|
|   | $\frac{1}{16}$ | $\frac{2}{16}$ | $\frac{1}{16}$ |   |
|   | $\frac{2}{16}$ | $\frac{4}{16}$ | $\frac{2}{16}$ |   |
|   | $\frac{1}{16}$ | $\frac{2}{16}$ | $\frac{1}{16}$ |   |
|   |   |   |   |   |

FIG. 26B

| $\frac{1}{256}$ | $\frac{4}{256}$ | $\frac{6}{256}$ | $\frac{4}{256}$ | $\frac{1}{256}$ |
|---|---|---|---|---|
| $\frac{4}{256}$ | $\frac{16}{256}$ | $\frac{24}{256}$ | $\frac{16}{256}$ | $\frac{4}{256}$ |
| $\frac{6}{256}$ | $\frac{24}{256}$ | $\frac{36}{256}$ | $\frac{24}{256}$ | $\frac{6}{256}$ |
| $\frac{4}{256}$ | $\frac{16}{256}$ | $\frac{24}{256}$ | $\frac{16}{256}$ | $\frac{4}{256}$ |
| $\frac{1}{256}$ | $\frac{4}{256}$ | $\frac{6}{256}$ | $\frac{4}{256}$ | $\frac{1}{256}$ |

GAME SYSTEM AND IMAGE GENERATING METHOD

TECHNICAL FIELD

The present invention relates to a game system, program and image generating method.

BACKGROUND ART

In the prior art, there is known an image generating system which can generate an image viewable from a given viewpoint in an object space that is a virtual three-dimensional space. Such an image generating system is very popular as a system which can realize a so-called virtual reality. If the image generating system is for a racing game, a player can enjoy a three-dimensional game by controlling and running a racing car (or object) in the object space to compete with the other racing cars controlled by the other players or computer.

However, an image generated by the prior art image generating system will not be focused depending on the distance from a viewpoint as in the actual human view. Thus, the representation is such that all the subjects within the image are in focus.

The image in which all the subjects ranging between the shouting distance and the long distance are in focus is abnormal in our daily life.

To pursue the reality, it is desirable that an image is generated in which a focus is regulated depending on the distance between the viewpoint and an object or the direction of sight line. However, the processing load will be increased if a defocused image is generated by calculating the distance between an individual object and the viewpoint within a game space to process the degree of defocusing for each object.

In an image generating system which must generate an image corresponding to a real-time variable viewpoint using its limited hardware resource, it is important that such an image as focused or defocused in the actual world can be generated using less processing load.

DISCLOSURE OF THE INVENTION

In view of the aforementioned problem, an objective of the present invention is to provide a game system and information storage medium which can generate a more realistic image with less processing load.

Another objective of the present invention is to provide a game system and information storage medium which can generate a realistic image using an alpha($\alpha$) value set depending on a depth value with less processing load.

Still another objective of the present invention is to provide a game system and information storage medium which can generate such an image as focused or defocused in the actual world with less processing load.

To accomplish these objectives, the present invention provides a game system which generates an image, comprising: means which transforms a depth value of each pixel of an original image into a second depth value formed of lower bits I to J which are positioned lower than the most significant bit of the depth value; means which sets an alpha value of each pixel to a value corresponding to the second depth value; and means which generates an image based on the set alpha value. The present invention also provides a computer-usable information storage medium comprising a program for a computer to realize the above-described means. The present invention further provides a computer-usable program (including a program embodied in a carrier wave) comprising a processing routine for a computer to realize the above-described means.

According to the present invention, the depth value for each pixel in the original image is transformed into the second depth value consisting of the bits I to J in the first-mentioned depth value. Next, an alpha value for each pixel is set at a value depending to the second depth value, the set alpha value being used to generate an image. Application of the alpha value enables various image representations (such as depth of field, fog effects or depth cueing).

According to the present invention, the alpha value for each pixel is set at a level depending on the second depth value formed of lower bits I to J than the most significant bit in the depth value. Therefore, the effective number of partitions in the alpha value (or the effective number of threshold steps in the depth value) can be increased in comparison with a technique of setting a train of higher bits including the most significant bit in the depth value as a second depth value. As a result, the alpha value can be controlled with improved accuracy, using multi-stepped thresholds. This improves images to be generated in quality.

The alpha value is information stored associated with each pixel, such as information other than color information. Techniques of setting the alpha value at a level depending on the second depth value include a method of using a lookup table for index color texture mapping, or a method of updating an alpha value of a deeper or closer pixel from a virtual object by drawing virtual objects in a sequential manner, for example.

In the game system, information storage medium or program of the present invention, the original image may be blended with a defocused image of the original image based on the alpha value set for each pixel.

In this configuration, a depth value for each pixel in the original image is transformed into a second depth value formed of bits I to J in the depth value. An alpha value for each pixel is then set depending on the second depth value, and the set alpha value is then used to blend the original image with its defocused image. Therefore, the blending ratio or other factors of the defocused image can be changed depending on the depth value (or the second depth value), enabling representation of the depth of field or the like.

According to the present invention, since the effective number of partitions for the alpha value can be increased, the degree of defocusing in an object located near the focus (or a gazing point) of a virtual camera can more accurately be controlled by using multi-stepped threshold values to improve the quality of generated images.

The technique of blending the original image with its defocused image may be any of various known techniques. The process of blending the images using the alpha value is not limited to the alpha ($\alpha$) blending in narrow sense.

The representation of image using the alpha value according to the technique of the present invention is not limited to a representation of depth of filed.

Alpha blending on the color of the original image and a given color based on the alpha values set according to the present invention enables fog effects in which the color of the original image approaches to the given color as an object of the original image becomes further from (or closer to) the viewpoint.

The brightness or chroma of the original image may be changed based on the set alpha values.

Moreover, alpha blending may be performed on the original image and a given other image based on the set alpha values.

Alternatively, based on the set alpha values, alpha blending may be performed on the original image and its transformed image (on which gamma correction, negative/positive inversion, posterization, solarization, binarization, monotone filtering, sepia filtering or the like is performed).

In the game system, information storage medium or program of the present invention, the defocused image of the original image may be generated by setting the original image as a texture and shifting texture coordinates of a virtual object when the texture is mapped onto the virtual object by texel interpolation method.

In this configuration, a simplified process in which an original image is mapped on a virtual object by the texel interpolation method while shifting the texture coordinates can be used to defocus the original image.

The texel interpolation method is not limited to particular processes, but it is a process to obtain image information of a pixel by interpolating image information of a texel, and there is bilinear filtering or trilinear filtering, for example.

A virtual object may be primitive surfaces such as polygons or the like, or may be a three-dimensional object. Although it is desirable that the virtual object is not displayed on a screen, it may be displayed on the screen.

When a defocused image is generated by texture mapping using texel interpolation method, it is desirable that the texture coordinates are shifted by a value smaller than one texel. After texture mapping using texel interpolation method is performed by shifting the texture coordinates in a direction of a first shift, texture mapping using texel interpolation method may be carried out again by shifting the texture coordinates in a direction of a second shift. Alternatively, a set of shifting in directions of a first shift and a second shift may be repeated several times.

In the game system, information storage medium or program of the present invention, the second depth value may be clamped into a given value depending on a bit value other than the bits I to J in the depth value.

If a bit other than the bits I to J in the depth value becomes one 1, this configuration can generate a consistent image. The given value may be any of various values such as the maximum or minimum values of the second depth value, or a value in which a train of higher bits of the second depth value set to 1 and so on.

In the game system, information storage medium or program of the present invention, the depth value may be set as an index number in a lookup table for index color texture-mapping; and the depth value may be transformed into the second depth value by performing index color texture-mapping on a virtual object by using the lookup table.

In this configuration, a variety of transformation processes, including clamping of the second depth value into a given value, can be implemented with a reduced processing load in which only the transforming properties of the lookup table are changed.

A virtual object may be primitive surfaces such as polygons or the like, or may be a three-dimensional object. Although it is desirable that the virtual object is not displayed on a screen, it may be displayed on the screen.

In the game system, information storage medium or program of the present invention, bits M to N in the depth value may be set as an index number in a first lookup table for index color texture-mapping; the depth value may be transformed into a third depth value by performing index color texture-mapping on a virtual object by using the first lookup table; bits K to L (where $K \geq I \geq L > M \geq J \geq N$) in the depth value may be set as an index number in a second lookup table for index color texture-mapping; the depth value may be transformed into a fourth depth value by performing index color texture-mapping on a virtual object by using the second lookup table; and the third and fourth depth values may be used to determine the second depth value.

In such a manner, if there is a restriction by which only a train of bits within a given range of the depth value (e.g., 0 to 7, 8 to 15, 16 to 23 or 24 to 31 bits) can be fetched, the second depth value formed of any bits between I and J in the depth value can be obtained. Thus, the effective number of partitions in the alpha value (or the effective number of threshold steps in the depth value) can be increased to improve the quality of generated images.

The present invention further provides a game system which generates an image, comprising: means which sets bits M to N in given image information as an index number in a first lookup table for index color texture-mapping, and uses the first lookup table to perform index color texture-mapping on a virtual object to transform the image information into third image information; means which sets bits K to L in the image information as an index number in a second lookup table for index color texture-mapping, and uses the second lookup table to perform index color texture-mapping on a virtual object to transform the image information into fourth image information; and means which determines second image information formed of the bits I to J (where $K \geq I \geq L > M \geq J \geq N$) in the image information based on the third and fourth image information. The present invention further provides a computer-usable information storage medium comprising a program for a computer to realize the above-described means. The present invention still further provides a computer-usable program (including a program embodied in a carrier wave) comprising a processing routine for a computer to realize the above-described means.

Even if there is a restriction by which only a train of bits within a given range of the image information (e.g., 0 to 7, 8 to 15, 16 to 23 or 24 to 31 bits) can be fetched, the second image information formed of any bits between I and J in the image information can be obtained according to the present invention.

The present invention can effectively use the index color texture-mapping function originally possessed by the game system (or image generating system) for transforming the image information into the second image information. The transformation of the image information can easily be carried out for the entire display screen with increased speed and without addition of any hardware.

The image information or second image information may be one drawn in a drawing region (e.g., frame buffer or additional buffer) and include color information, alpha value, depth value or the like.

In the game system, information storage medium or program of the present invention, the virtual object may be a polygon having a size equal to a size of a display screen.

In this configuration, the depth value in an original image for the entire display screen can be transformed into an alpha value through a single or several times of texture mapping, for example.

Alternatively, in the game system, information storage medium or program of the present invention, the virtual object may be a polygon having a size equal to a size of a block obtained by dividing a display screen into blocks.

In this configuration, a region in which a virtual object is drawn can be reduced in size to save the capacity of the memory to be used.

BRIEF DESCRIPTION OF THE DRAWINGS

FIG. 3 illustrates the index color texture-mapping process.

FIGS. 11A and 11B show an original image and its defocused image.

FIGS. 13A, 13B and 13C illustrate a technique of updating the alpha value of a deeper a pixel from a virtual object by drawing the virtual object.

FIG. 15 illustrates a problem raised if the Z2-value is formed by higher bits including the most significant bit in the Z-value.

FIG. 16 illustrates a technique of forming the Z2-value by lower bits I to J than the most significant bit of the Z-value and clamping the Z2-value at a given value.

FIG. 18 shows an example of LUT1 for transformation of the bits 15 to 8 in the Z-value.

FIG. 19 shows an example of LUT2 for transformation of the bits 23 to 16 in the Z-value.

FIGS. 26A and 26B also illustrate a principle of generating a defocused image through the bilinear filtering type interpolation.

BEST MODE FOR CARRYING OUT THE INVENTION

One preferred embodiment of the present invention will now be described in connection with the drawings.

1. Configuration

Figure 1:
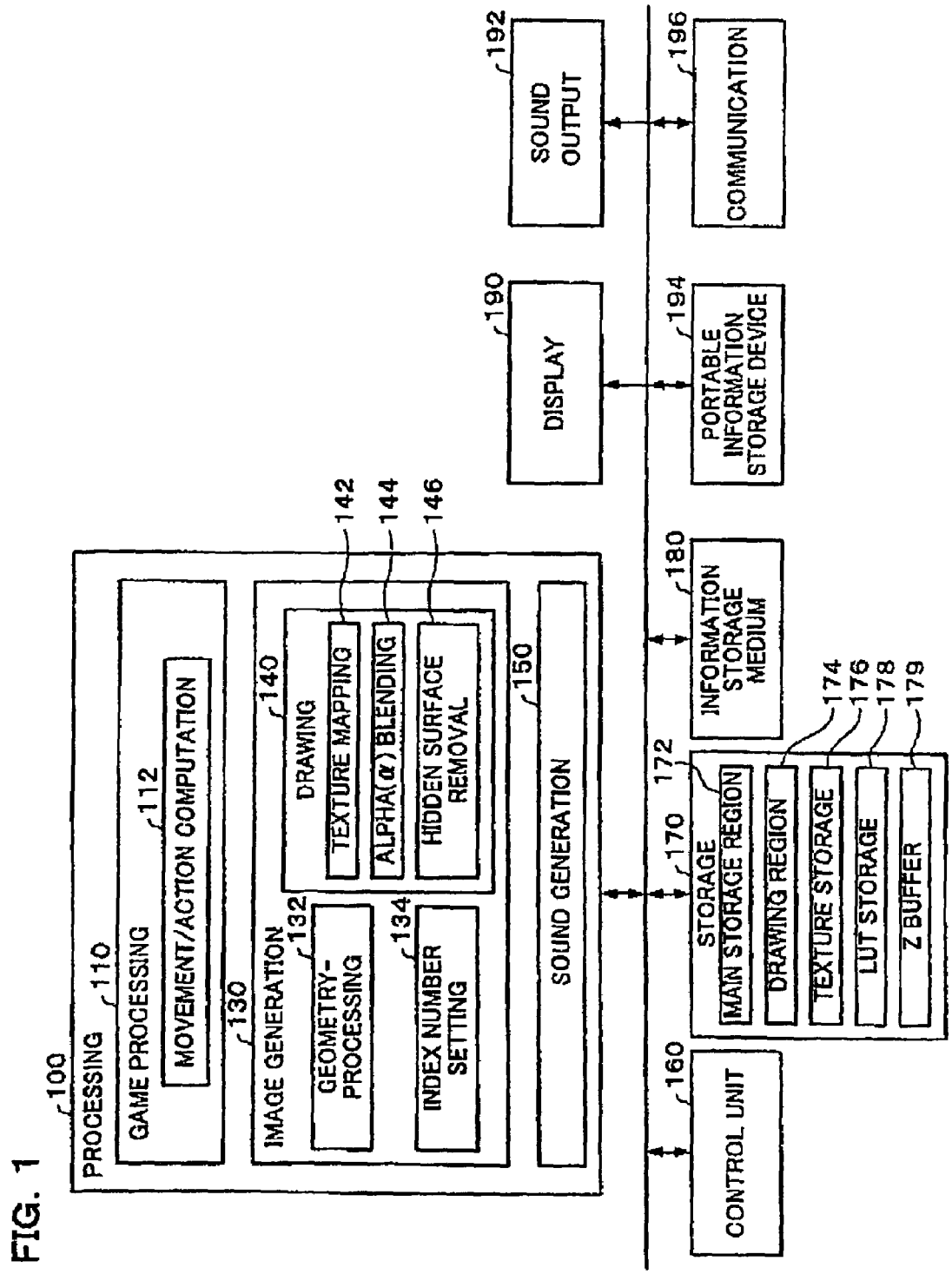
FIG. 1 is a block diagram of a game system according to this embodiment of the present invention.

FIG. 1 shows a block diagram of a game system (or image generating system) according to this embodiment. In this figure, this embodiment may comprise at least a processing section 100. Each of the other blocks may take any suitable form.

The processing section 100 performs various types of processing for control of the entire system, commands to the respective blocks in the system, game processing, image processing, sound processing and so on. The function thereof may be realized through any suitable hardware means such as various processors (CPU, DSP and so on) or ASIC (gate array or the like) or a given program (or game program).

An operating section 160 is used to input operational data from the player and the function thereof may be realized through any suitable hardware means such as a lever, a button, a housing or the like.

A storage section 170 provides a working area for the processing section 100, communication section 174 and others. The function thereof may be realized by any suitable hardware means such as RAM or the like.

An information storage medium (which may be a computer-usable storage medium) 180 stores information including programs, data and others. The function thereof may be realized through any suitable hardware means such as optical memory disk (CD or DVD), magneto-optical disk (MO), magnetic disk, hard disk, magnetic tape, memory (ROM) or the like. The processing section 100 performs processing in the present invention (or this embodiment) based on the information that has been stored in this information storage medium 180. In other words, the information storage medium 180 stores various pieces of information (programs or data) for causing a computer to realize the means of the present invention (or this embodiment) which are particularly represented by the blocks included in the processing section 100.

Part or the whole of the information stored in the information storage medium 150 will be transferred to the storage section 170 when the system is initially powered on. The information stored in the information storage medium 180 may contain at least one of program code set for processing the present invention, image data, sound data, shape data of objects to be displayed, table data, list data, information for instructing the processing in the present invention, information for performing the processing according to these instructions and so on.

A display section 190 is to output an image generated according to this embodiment and the function thereof can be realized by any suitable hardware means such as CRT, LCD or HMD (Head-Mount Display).

A sound output section 192 is to output a sound generated according to this embodiment and the function thereof can be realized by any suitable hardware means such as loudspeaker.

A portable information storage device 194 is to store the player's personal data (or data to be saved) and may be take any suitable form such as memory card, portable game machine and so on.

A communication section 196 performs various controls for communication between the game system and any external device (e.g., host machine or other game system). The function thereof may be realized through any suitable hardware means such as various types of processors or communication ASIS or according to any suitable program.

The program or data for realizing (or executing) the means in the present invention (or this embodiment) may be delivered from an information storage medium included in a host machine (or server) to the information storage medium 180 through a network and the communication section 196. The use of such an information storage medium in the hose device (or server) falls within the scope of the invention.

The processing section 100 further comprises a game processing section 110, an image generation section 130 and a sound generation section 150.

The game processing section 110 performs various processes such as coin (or charge) reception, setting of various modes, game proceeding, setting of screen selection, determination of the position and rotation angle (about X-, Y- or Z-axis) of an object (or one or more primitive surfaces), movement of the object (motion processing), determination of the view point (or virtual camera' position) and visual-line angle (or rotational virtual camera angle), arrangement of an object such as mapped object within the object space, hit checking, computation of the game results (or scores), processing for causing a plurality of players to play in a common game space, various game computations including game-over and other processes, based on operational data from the operating section 160 and according to the personal data and game program from the portable information storage device 194.

The image generation section 130 performs image processing according to the commands or the like from the game processing section 110. For example, the image generation section 130 may generate an image within an object space as viewed from a virtual camera (or viewpoint), which image is in turn outputted toward the display section 190. The sound generation section 150 performs various sound processing according to the commands and the like from the game processing section 110 for generating BGMs, sound effects, voices or the like which are in turn outputted toward the sound output section 192.

All the functions of the game processing section 110 and the image and sound processing sections 130, 150 may be realized by any suitable hardware means or according to the program. Alternatively, these functions may be realized by both the hardware means and program.

The game processing section 110 further comprises a movement/action computation section 112.

The movement/action computation section 112 is to calculate the information of movement for objects such as motor-cars and so on (positional and rotation angle data) and the information of action for the objects (positional and rotation angle data relating to the parts in the objects). For example, the movement/action computation section 112 may cause the objects to move and act based on the operational data inputted by the player through the operating section 160 and according to the game program.

More particularly, the movement/action computation section 112 may determine the position and rotational angle of the object, for example, for each one frame (1/60 seconds). For example, it is now assumed that the position of the object for (k-1) frame is PMk-1, the velocity is VMk-1, the acceleration is Amk-1, time for one frame is Δt. Thus, the position PMk and velocity VMk of the object for k frame can be determined by the following formulas (1) and (2):

$$PMk = PMk\text{-}1 + VMk\text{-}1 \times \Delta t \quad (1)$$

$$VMk = VMk\text{-}1 + Amk\text{-}1 \times \Delta t \quad (2)$$

The image generation section 130 comprises a geometry-processing section 132, an index number setting section 134 and a drawing section 140.

The geometry-processing section 132 performs geometry processing (or three-dimensional computations) such as coordinates transformation, clipping, perspective transformation, light-source calculation and so on. After subjected to the geometry-processing (or perspective transformation), the object data (such as shape data including the vertex coordinates and others in the object, or vertex texture coordinates, brightness data and the like) is saved in a main storage region 172 in the storage section 170.

The index number setting section 134 is to set the image information of the original image (e.g., perspective-transformed image information) as an index number in an LUT (lookup table) storage section 178 for an index color texture-mapping. The image information of the original image may take any of various information forms such as color information (RGB, YUV or the like), alpha value (or any information stored in association with each of the pixels, other than the color information), depth value (Z-value) and so on.

In this embodiment, a lookup table in which the depth value for each pixel in the original image is set at an index number is used to perform the index color texture-mapping relative to a virtual object such that the alpha value for each pixel depending on the depth value for each pixel in the original image will be set. Thus, a so-called depth of field or fogged image can be represented according to this embodiment.

It is desirable that the correspondent relationship between the depth value (index number) and alpha value for each pixel in the LUT (lookup table) is so set that as a pixel is located farther from the focus of the virtual camera, the alpha value thereof increases (or has a higher blending rate of the defocused image in a broad sense). In addition, the depth of field or defocusing effect may variably be controlled by changing the correspondent relationship between the depth value and alpha value for each pixel in the LUT.

The drawing section 140 is to draw the geometry-processed object (or model) in a drawing region 174 (which is a region in a frame buffer, an additional buffer or the like for storing the image information by a pixel unit). The drawing section 140 comprises a texture mapping section 142, an alpha blending section 144 and a hidden surface removal section 146.

The texture mapping section 142 performs a process of mapping a texture stored in the texture storage section 176 onto an object (including a process of specifying a texture to be mapped on an object, a process of transferring a texture and other processes). In such a case, the texture mapping section 142 can perform the texture mapping using the index color texture-mapping LUT (lookup table) stored in the LUT storage section 178.

In this embodiment, the texture mapping section 142 performs the texture mapping relative to the virtual object (such as a polygon having a size equal to that of the display screen, a polygon having a size equal to a size of a block of divided screen and the like) using the LUT in which the image information of the original image is set as an index number. Thus, a process of transforming the depth value (Z-value) into N bits, a process of transforming the depth value into the alpha value and various other image transforming processes (e.g., gamma correction, negative/positive inversion, posterization, solarization, binarization, mono-tone filtering and sepia filtering) can be realized with reduced processing load.

In addition, this embodiment implements the generation of a defocused image (or most-defocused image) blended with the original image through the alpha blending (such as narrow-sensed alpha blending, additive alpha blending, subtractive alpha blending, or translucency processing) by effectively utilizing texture mapping by texel interpolation method (bilinear or trilinear filtering).

More particularly, the texture mapping section 142 maps the original image set as a texture on the virtual object (which is an object having its shape equal to that of the defocused region) through the texel interpolation method while, for example, shifting the texture coordinates by a value smaller than one pixel (texel) (or shifting it from the texture coordinates obtained based on the drawn position of the original image). Thus, the defocused image to be blended with the original image can be generated through a simplified procedure by which the texture coordinates are only shifted.

The alpha-blending section 144 is to blended an original image with its defocused image based on an alpha value (A value) which has been set for each of the pixels in the drawing region 174 (a frame buffer or the like). For example, when a narrow sensed alpha blending is performed, the original image is blended with the defocused image as represented by the following formulas:

$$R_0 = (1-\alpha) \times R_1 + \alpha \times R_2 \quad (3)$$

$$G_0 = (1-\alpha) \times G_1 + \alpha \times G_2 \quad (4)$$

$$B_0 = (1-\alpha) \times B_1 + \alpha \times B_2 \quad (5)$$

where $R_1$, $G_1$ and $B_1$ are respectively color (or brightness) R, G and B components in the original image already drawn in the drawing region 174; $R_2$, $G_2$ and $B_2$ are respectively color R, G and B components in the defocused image; and $R_0$, $G_0$ and $B_0$ are respectively R, G and B components generated through the alpha blending.

An image on which alpha blending (such as narrow-sensed alpha blending, additive alpha blending, subtractive alpha blending, or translucency processing) is performed together with an original image is not limited to a defocused image of the original image. For example, alpha blending may be performed on an original image and any other image. Alternatively, alpha blending may be performed on an original image and its transformed image (transformed by gamma correction, negative/positive inversion, posterization, solarization, binarization, mono-tone filtering, sepia filtering or the like).

The hidden surface removal section 146 performs the hidden-surface removal according to Z-buffer algorithm, using a Z buffer (or Z plane) 179 in which the Z-value (depth value) is stored. In this embodiment, the Z-value written in this Z buffer 179 is transformed into alpha value on which the original image is blended with the defocused image.

The game system of this embodiment may be dedicated for a single-player mode in which only a single player can play the game or may have a multi-player mode in which a plurality of players can play the game.

If a plurality of players play the game, only a single terminal may be used to generate game images and sounds to be provided to all the players. Alternatively, a plurality of terminals (game devices or portable telephones) interconnected through a network (transmission lien or communication line) may be used in the present invention.

2. Features of the embodiment 2.1 Index color texture-mapping

It is desirable that upon generation of an image in the game system, a certain transformation called gamma correction is subjected to the image to correct a non-linear property in a monitor (or display section).

There are first and second techniques for realizing such a gamma correction which will be described below.

Figure 2A:
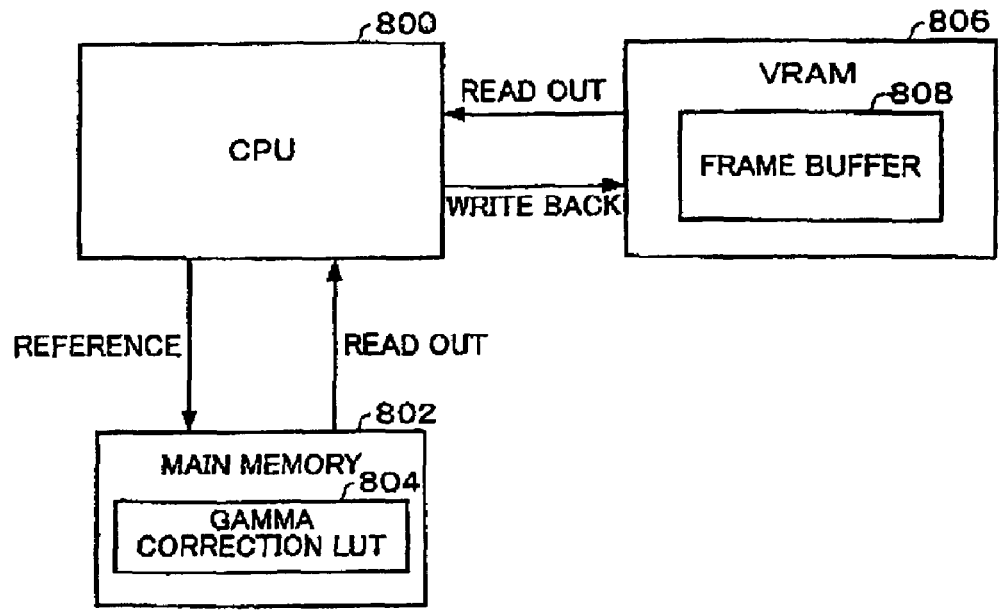
FIGS. 2A and 2B illustrate first and second techniques for realizing the gamma correction.

The first technique has provided a gamma correction LUT (lookup table) in a main memory 802, as shown in FIG. 2A. CPU 800 (or a software running on the CPU) then reads the color information (RGB) for each pixel in an original image from a frame buffer 808 within VRAM 806. The read color information is then used to refer to the gamma correction LUT and to provide the gamma-corrected color information. The resulting gamma corrected color information is then drawn back to the corresponding pixel in the frame buffer. Such a process will be repeated for all the pixel in the original image.

Figure 2B:
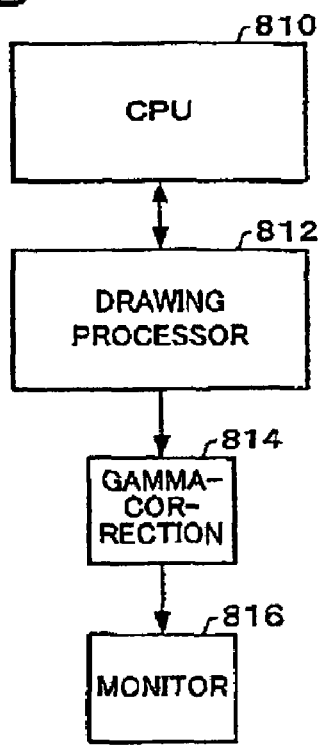

On the other hand, the second technique provides a gamma-correction circuit 814 for realizing the gamma correction in hardware, which is located downstream of a drawing processor 812 running under the control of the COU 810, as shown in FIG. 2B. The gamma-correction circuit 814 performs the gamma correction relative to the color information generated by the drawing processor 812, the gamma-corrected color information being finally outputted toward a monitor 816.

However, the first technique shown in FIG. 2A uses the software running on the CPU 800, which software must performs all the processing such as reading of the color information from the frame buffer 808, referring to the gamma correction LUT 804, reading the color information out of the gamma correction LUT 804 and writing of the read color information back to the frame buffer 808. Thus, the processing speed will not be increased. It is thus difficult to complete the gamma correction relative to all the pixels on the display screen within one frame. The processing load on the CPU 800 will extremely be heavy, thus adversely affecting any other processing.

On the other hand, the second technique of FIG. 2B can increase the speed of gamma correction since it uses a gamma-correction circuit which is of a dedicated hardware. Thus, the second technique can easily complete the gamma correction for all the pixels on the display screen within one frame. Moreover, the second technique can overcome such a problem as adversely affecting any other processing since the processing load on the CPU 810 is reduced.

However, the second technique of FIG. 2B requires a separate gamma-correction circuit 814 which is a dedicated hardware. The game system will be increased in scale and raise another problem in that the manufacturing cost is increased.

Particularly, the domestic game systems are severely required to be reduced in manufacturing cost for more popularization. Therefore, most domestic game systems did not have such a gamma-correction circuit as shown in FIG. 2B as hardware. In order to realize the gamma correction, such domestic game systems cannot but take the first technique as shown in FIG. 2A.

As described, however, it is difficult that the first technique completes the gamma correction for the entire display screen within one frame, thereby adversely affecting any other processing. As a result, the domestic game systems cannot but abandon the gamma correction itself.

The inventors aimed at the lookup table LUT used in the index color texture-mapping process.

In the index color texture-mapping process, an index number, rather than the actual color information (RGB), is stored in association with each texel in a texture to save the capacity of the texture storage section to be used, as shown at A1 in FIG. 3. In addition, as shown at A2 in FIG. 3, the color information specified by the index number is stored in the index color texture-mapping LUT (color pallet). When the texture mapping is to be performed on an object, the LUT is referred to based on the index number for each texel in the texture and the corresponding color information is read out of the LUT. The read color information is then drawn in a frame buffer.

The number of colors used on the texture mapping in such an index color mode is reduced, for example, into 256 colors, in comparison with the conventional texture mapping that do not use the LUT. However, the capacity of the texture storage section to be used can greatly be saved since it in not required to store the actual color information (e.g., 16-bit color information) in the texture storage section.

This embodiment is characterized by using such an index color texture-mapping process in an unusual manner.

Figure 4:
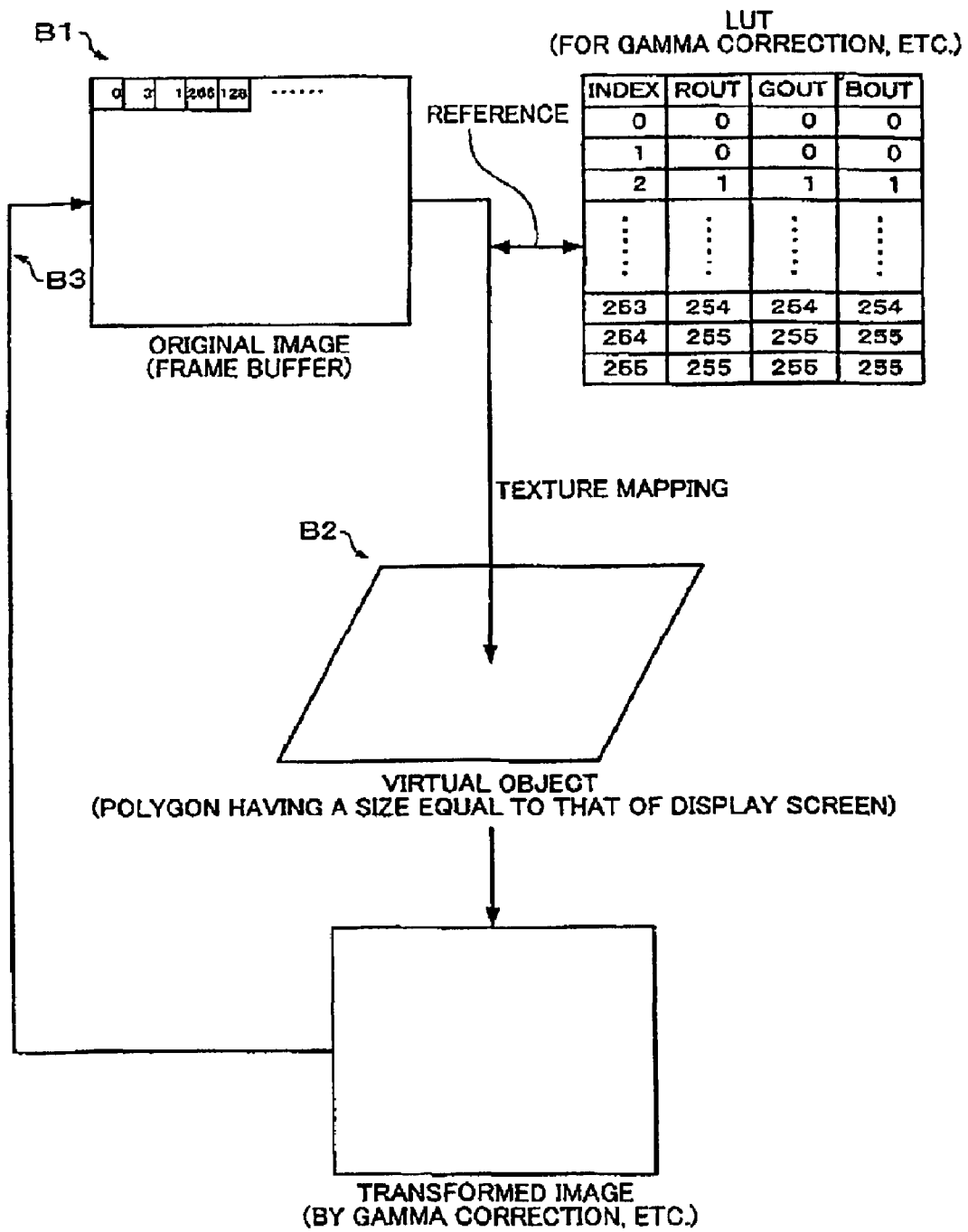
FIG. 4 illustrates a technique of transforming an original image by effectively using an index color texture-mapping lookup table.

More particularly, the image information (e.g., color information) for each pixel in an original image drawn in a frame buffer (which is, in a broad sense, a drawing region) is first set (or considered) as an index number in a gamma-correction lookup table LUT, as shown at B1 in FIG. 4. Next, the LUT in which the image information of the original image has been set as the index number is used to perform the index color texture-mapping relative to an virtual object (e.g., a polygon having its size equal to that of the display screen) for transformation of the image information of the original image, as shown at B2 in FIG. 4. The transformed image information is finally drawn back to the frame buffer (or drawing region), as shown at B3 in FIG. 4.

Figure 5A:
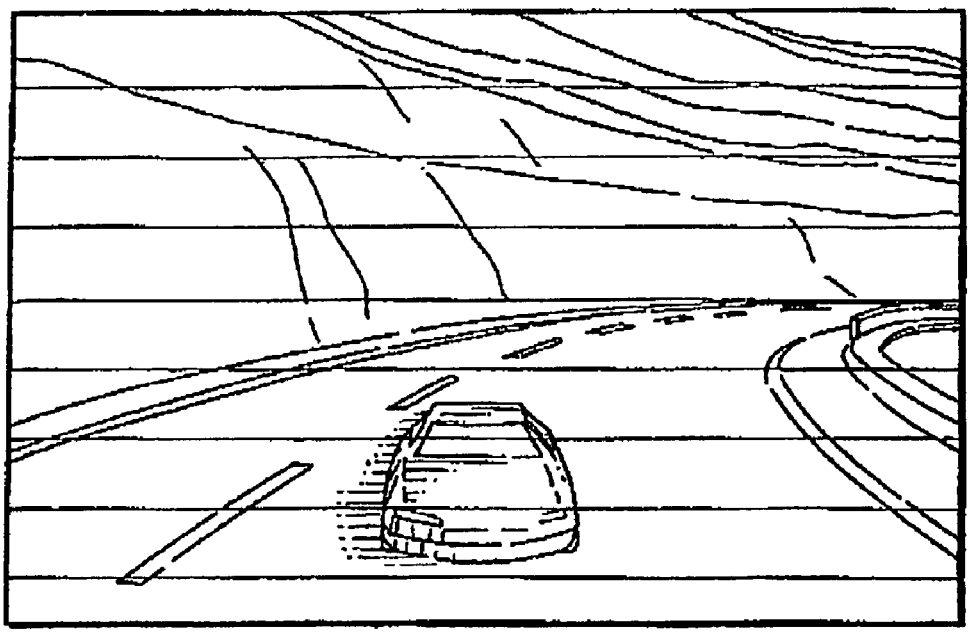
FIGS. 5A and 5B show game images generated according to this embodiment.
Figure 5B:
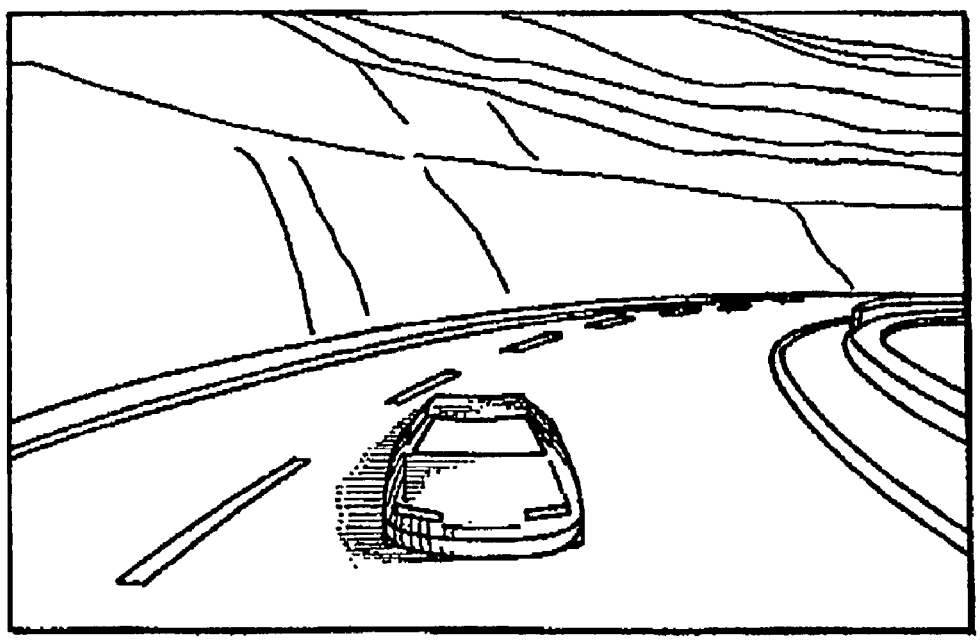

In such a manner, this embodiment successfully provides the gamma-corrected image shown in FIG. 5B from the original image shown in FIG. 5A. It is to be noted that the image of FIG. 5B is more contrasted than that of FIG. 5A.

In the first technique of FIG. 2A, all the processing such as reading of the color information in the original image, referring to the gamma-correction LUT, writing of the color information back to the frame buffer and others will be performed in software running on CPU. Thus, the processing speed cannot be increased with increase of the processing load on CPU.

On the contrary, this embodiment realizes the gamma correction by effectively using the index color texture-mapping process. The index color texture-mapping process is accomplished at higher speed by a drawing processor (or drawing section) which is a dedicated hardware. According to this embodiment, thus, the gamma correction can be executed at a speed higher than that of the first technique shown in FIG. 2A such that the gamma correction for the entire display screen will easily be completed within one frame (e.g., 1/60 seconds or 1/30 seconds).

Since the index color texture-mapping process is executed by the drawing processor separated from the main processor (CPU), the processing load on the main processor can be minimized. As a result, the gamma correction can be prevented from adversely affecting any other processing.

The processing ability of the drawing processor in the conventional game systems was not very high. It was thus difficult that the drawings of the original image into the frame buffer and of the polygon having its size equal to that of the display screen were completed within one frame.

However, the processing ability of the drawing processor in the game system has now been highly improved in comparison with the processing abilities of the other circuit blocks. Recently, a drawing processor having its very high fill rate (or the number of texels renderable for one second) has been used in the field of game system. Therefore, it becomes easy that the drawings of the original image into the frame buffer and of the polygon having its size equal to that of the display screen are completed within one frame. The gamma correction effectively using the index color texture-mapping process has been capable of being naturally realized.

The second technique of FIG. 2B requires a separate gamma-correction circuit which is a dedicated hardware leading to increase of the manufacturing cost. In the domestic game systems which did not originally include such a gamma-correction circuit, they cannot realize the second technique of FIG. 2B, but take the technique of FIG. 2A.

On the contrary, this embodiment realizes the gamma correction by effectively using the index color texture-mapping process. The index color texture-mapping process is executed through a hardware structure originally included in the drawing processor. According to this embodiment, therefore, such a gamma-correction circuit as shown in FIG. 2B is not newly required. This can prevent the game system from being expensive. Even in the domestic game systems not originally having the gamma-correction circuit, the high-speed gamma correction can be realized in hardware.

Although FIG. 4 shows the gamma correction (video filtering) implemented by texture mapping on a polygon having a size equal to a size of a display screen, texture mapping may be performed on a polygon having a site of a block obtained by dividing the display screen into blocks.

Figure 6:
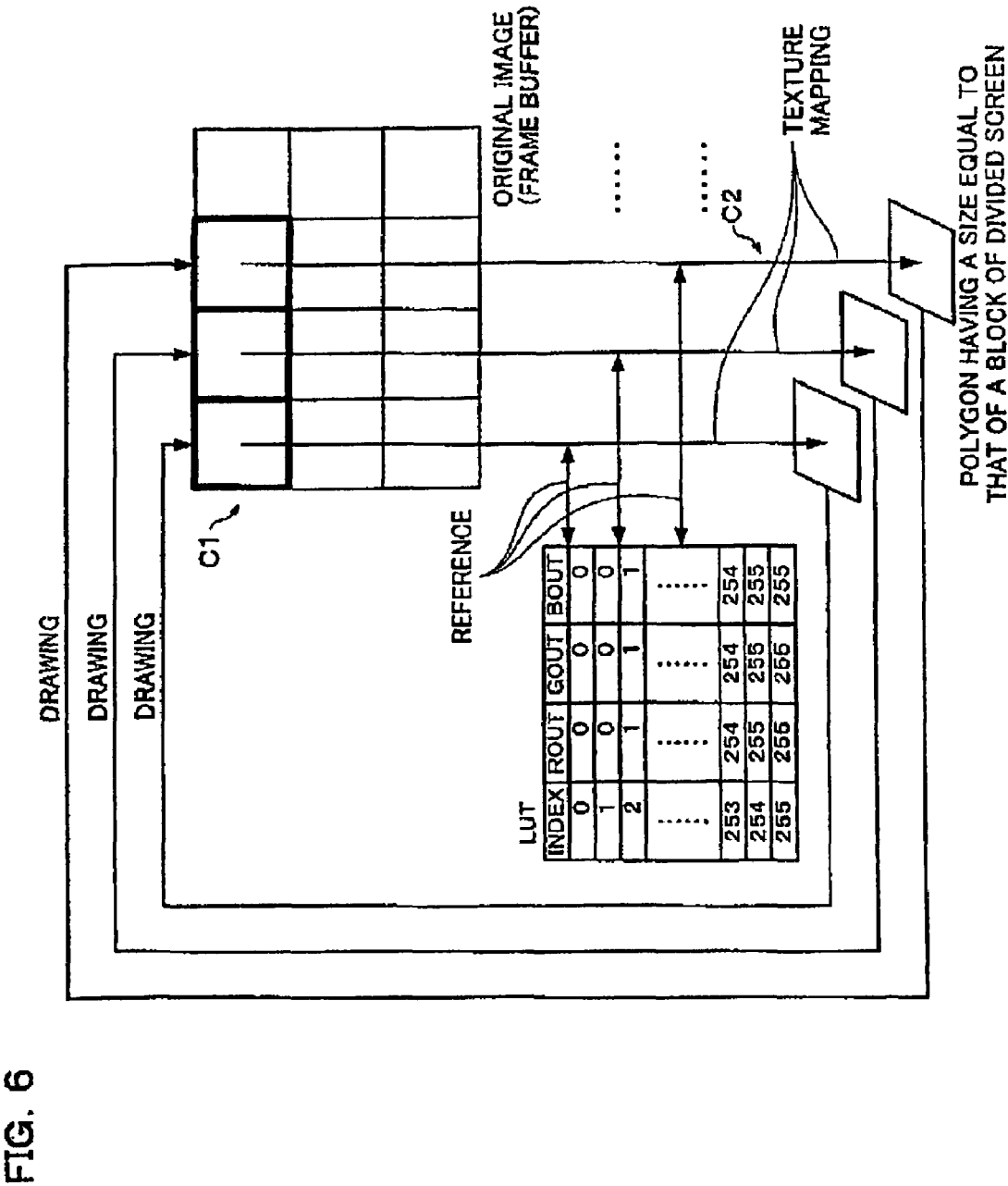
FIG. 6 illustrates a technique of dividing an original image into blocks, the image in each block being texture-mapped on a polygon having a size equal to a divided screen block.

More particularly, an original image (or display screen) on a frame buffer is divided into blocks, as shown at C1 in FIG. 6. The divided image of each block is texture-mapped on a polygon having a size equal to a size of a divided screen block by using an LUT, as shown at C2 in FIG. 6. Finally, the resulting image having a size equal to a size of divided screen block is drawn back to the frame buffer (or drawing region).

Alternatively, a polygon may be generated which includes the whole or part of the image of a perspective-transformed object (which has been transformed into the screen coordinate system) and has its magnitude variable depending on that of the perspective-transformed object. The texture mapping may be performed on that polygon.

Thus, an area on VRAM occupied by an additional buffer can be reduced, for example, when the texture mapped polygon is to be temporarily drawn in the additional buffer.

When the texture mapping is performed on a polygon having a size equal to that of the display screen as shown in FIG. 4, an additional buffer having a size equal to that of the display screen must be allocated on VRAM for temporarily drawing the polygon having a size equal to that of the display screen. This may adversely affect any other processing.

If the texture mapping in performed on a polygon having a size equal to a size of a block of divided screen as shown in FIG. 6, it is only required that an additional buffer having a size equal to a size of the block is provided on VRAM. Therefore, the area occupied by the additional buffer can be reduced. As a result, the limited hardware resource can effectively be utilized.

2.2 Masking

The gamma correction requires such an LUT that one value (ROUT, GOUT or BOUT) will be outputted relative to one input value (RIN, GIN or BIN).

However, the index color texture-mapping LUT shown in FIG. 3 will output a plurality of values (e.g., ROUT, GOUT and BOUT) relative to one input value (or index number). This is a problem in that such an LUT has a mismatch to be overcome.

Thus, this embodiment uses a masking process for only drawing the necessary image information piece in the transformed image information in a drawing region (a frame buffer or an additional buffer) without drawing any other image information pieces when the image information in the original image (e.g., R, G, B, Z-value or alpha value) is to be set as an index number in the LUT.

Figure 7:
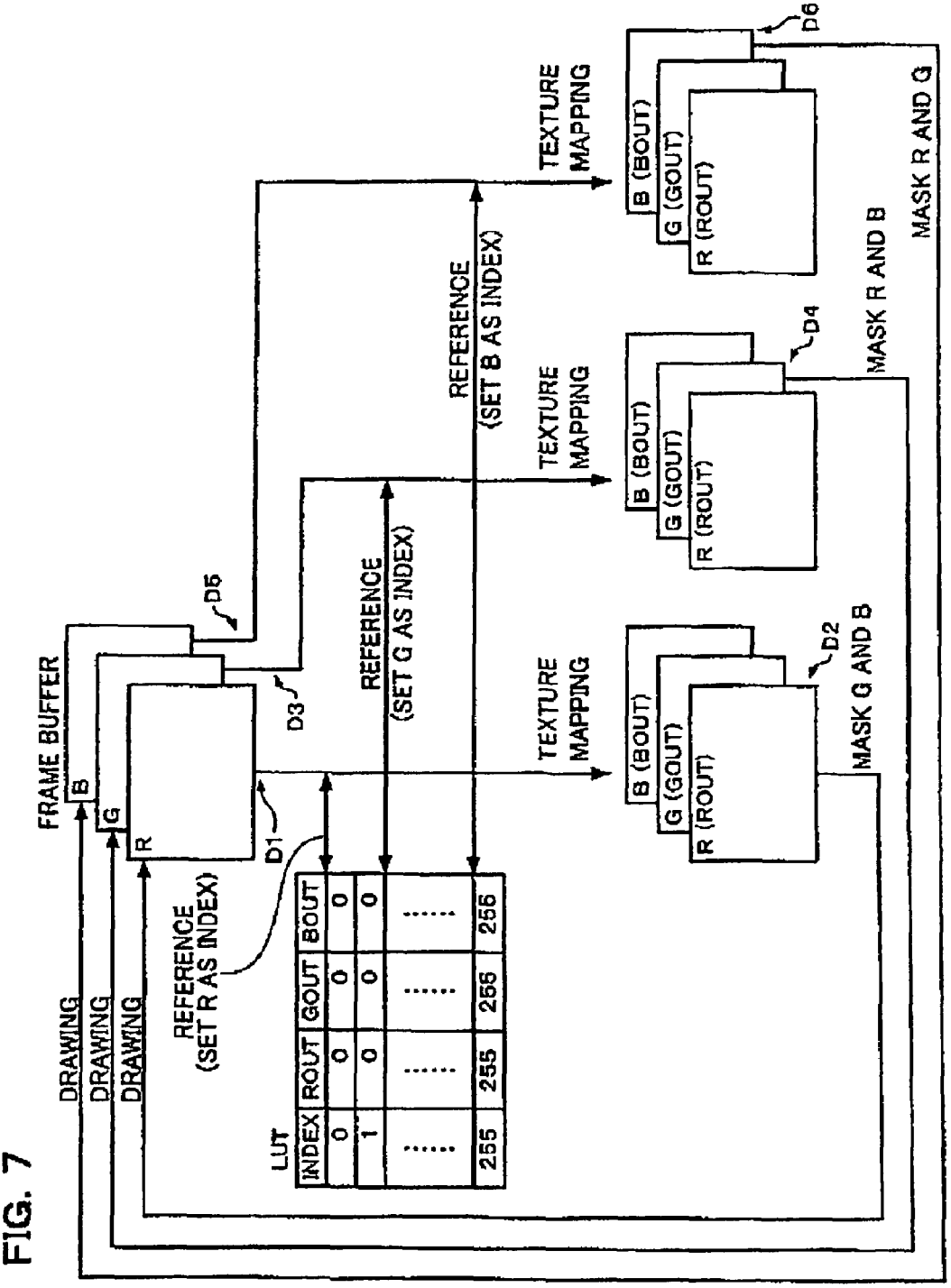
FIG. 7 illustrates a masking technique for only drawing the necessary image information among the image information obtained by transformation in LUT so that the other image information will not be drawn.

More particularly, as shown at D1 in FIG. 7, the R-plane value in an original image is set as an index number in an LUT which is in turn used to perform the texture mapping to output three plane values, R(ROUT), G(GOUT) and B(BOUT). In such a case, only the outputted R-plane values are drawn in the drawing region while the G- and B-plane values are masked and not drawn in the drawing region, as shown at D2 in FIG. 7.

If the G-plane value in the original image is set as an index number for texture mapping as shown at D3 in FIG. 7, only the outputted G-plane value is drawn in the drawing region while the R- and B-plane values are masked and not drawn in the drawing region, as shown at D4 in FIG. 7.

If the B-plane value in the original image is set as an index number for texture mapping as shown at D5 in FIG. 7, only the outputted B-plane value is drawn in the drawing region while the R- and G-plane values are masked and not drawn in the drawing region, as shown at D4 in FIG. 7.

In such a manner, the original image can be subjected to the image transformation with less processing load while using the index color texture-mapping LUT not originally designed for the gamma correction.

2.3 Application to Z-value and alpha value

The use of the color information R, G, B outputted based on the index color texture-mapping LUT has been described.

However, alpha value (A-value; information set in association with a pixel, other than the color information) outputted based on the index color texture-mapping LUT may be used.

Figure 8:
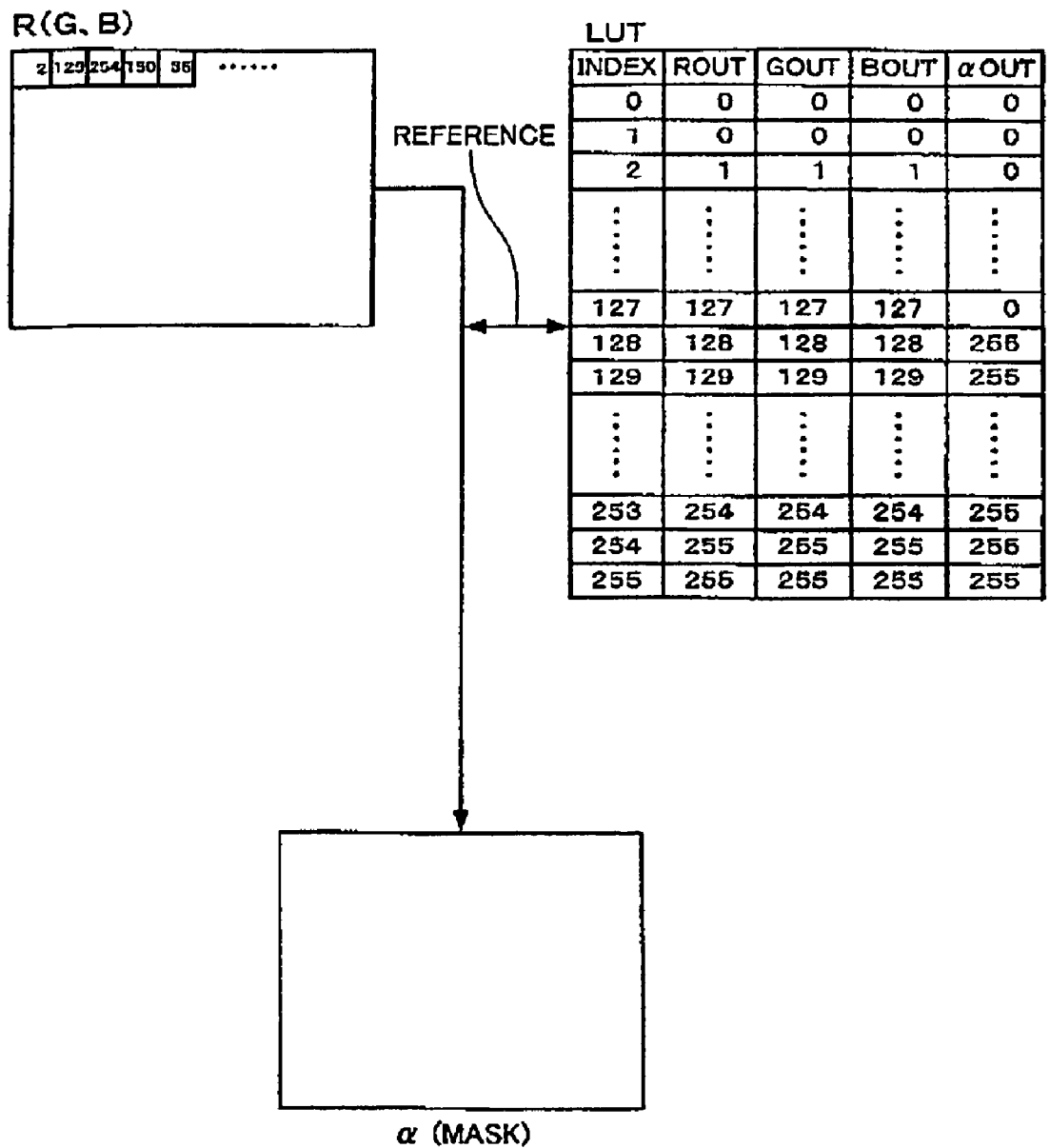
FIG. 8 illustrates a technique of forming an alpha ($\alpha$) plane through the texture mapping using LUT.

For example, as shown in FIG. 8, R-, G- or B-plane value may be set as an index number in an LUT which is in turn used to perform the texture mapping for generating an alpha (αOUT) plane. The generated alpha plane is then used to perform the masking or other process.

For example, there may be used an LUT in which the alpha (αOUT) value is set to be zero when the R-value is between 1 and 127 and to be 255 when the R-value is between 128 and 255. The masking process is not performed for a pixel having its alpha value smaller than 255, but will be made only for a pixel having its alpha value equal to 255. In such a manner, the masking process will be performed only for pixels having their R-value equal to or larger than 128. This enables the masking process to be made depending on the magnitude of the R-value in each pixel.

The generated alpha plane value may be used as an alpha blending coefficient (transparency, translucency or opacity).

The image information set as the index number in the LUT is not limited to the color information and may be one that is on the drawing region (VRAM) and can set as the index number in the LUT.

Figure 9:
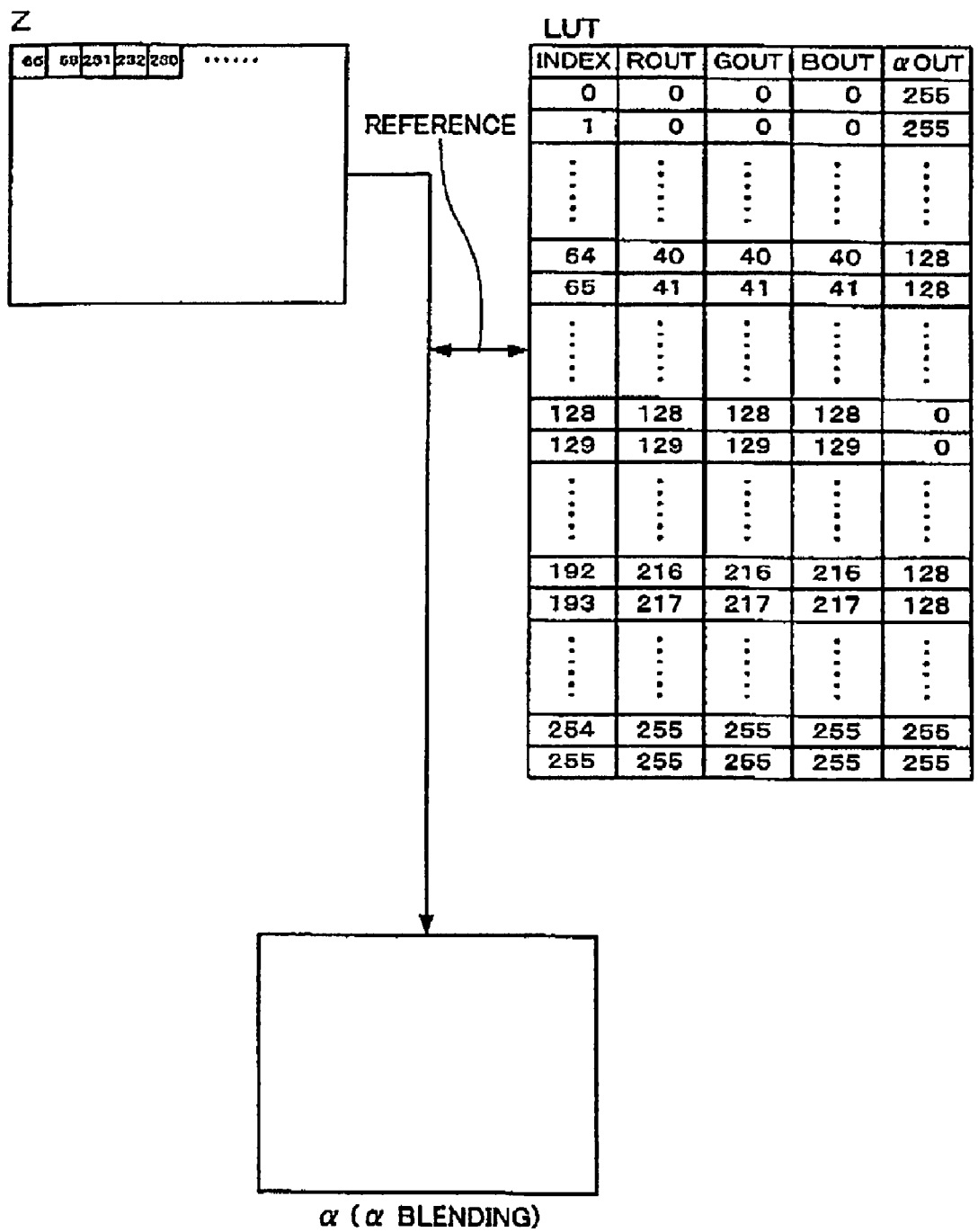
FIG. 9 illustrates a technique of setting Z-value as an index number in LUT.

For example, as shown in FIG. 9, the Z-value (or depth value) may be set as the index number in the LUT.

In such a case, the alpha plane value obtained by performing the index color texture-mapping after the Z value has been set as an index number may be used as an alpha blending coefficient, for example. Thus, an alpha value can be set depending on the Z value so that the depth of field or the like can be represented by using a defocused image.

Figure 10:
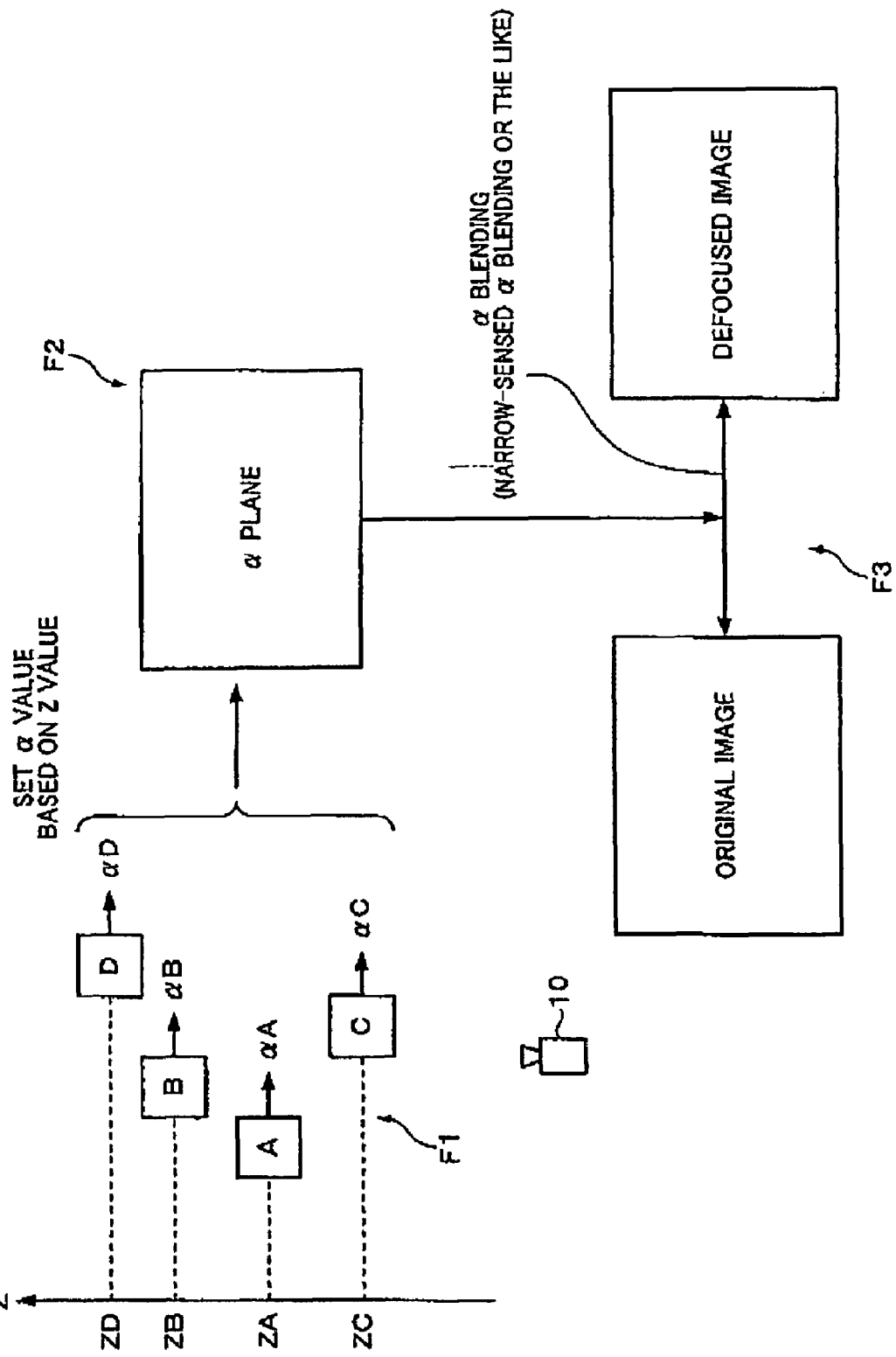
FIG. 10 illustrates a technique of setting an alpha value depending on a Z-value and then using the set alpha value to blend an original image with its defocused image.

When such an LUT as shown in FIG. 9 is used to perform the texture mapping, alpha values, αA, αB, αC and αD for the respective pixels A, B, C and D in an original image are set at values corresponding to the respective pixel Z-values, ZA, ZB, ZC and ZD of the original image, as shown at F1 in FIG. 10. Thus, such an alpha plane as shown at F2 in FIG. 10 is generated. More particularly, the alpha value in a pixel may be set larger as that pixel is located farther away from the focus of a virtual camera 10 (or a gazing point) or when that pixel has its Z-value more different from that of the focus. Thus, the blending ratio of defocused image will be increased as the pixel is farther from the focus of the virtual camera 10.

Next, as shown at F3 in FIG. 10, alpha blending of the original image and its defocused image is carried out based on the generated alpha plane (or the alpha value set for each pixel). FIG. 11A shows such an example of original image while FIG. 11B shows its defocused image.

By performing alpha blending of the original image (FIG. 11A) and its defocused image (FIG. 11B) based on the alpha values set depending on the Z values (or depth values) in such a manner, for example, an image can be generated in which the degree of defocusing therein will be increased as the pixels thereof are spaced farther apart from the focus of the virtual camera (that is, a focused point). This enables a so-called depth of field to be represented. Thus, unlike a conventional game image in which all objects in a screen are focused, this embodiment can generate a more realistic and natural image focused depending on the distance from a viewpoint like a real view. As a result, the player's feel for virtual reality can highly be improved.

Figure 12:
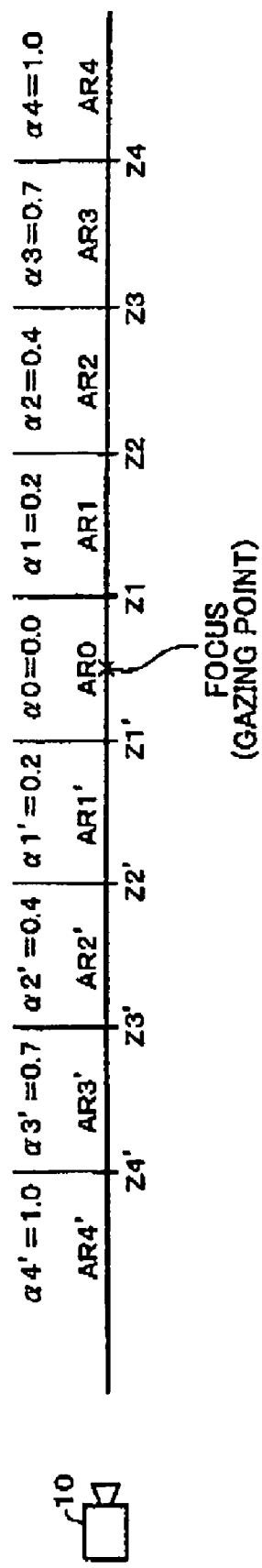
FIG. 12 illustrates a technique of setting alpha values depending on Z-values.

FIG. 12 exemplifies alpha values set depending on Z-values. In this figure, each of the alpha values is normalized to has its magnitude equal to or smaller than 1.0.

In FIG. 12, the area is partitioned into AR0-AR4 and AR1'-AR4' by Z-values (threshold values) Z1-Z4 and Z1'-Z4', respectively. Relative to these areas AR0-AR4 and AR1'-AR4', alpha values α0 to α4 and α1' to α4' are set respectively.

For example, a pixel located in the region AR1 between Z1 and Z2 may have its alpha value net at α1: a pixel located in the region AR2 between Z2 and Z3 may have its alpha value set at α2; a pixel located in the region AR1' between Z1' and Z2' may have its alpha value set at α1'; and a pixel located in the region AR2' between Z2' and Z3' may have its alpha value set at α2'.

The alpha values for the respective regions may be represented by the following relational expressions:

$$\alpha 0 < \alpha 1 < \alpha 2 < \alpha 3 < \alpha 4 \qquad (6)$$

$$\alpha 0 < \alpha 1' < \alpha 2' < \alpha 3' < \alpha 4' \qquad (7)$$

As will be apparent from these formulas (6) and (7), the alpha value is increased as the pixel is located farther from the focus of the virtual camera 10 (or a gazing point). In other words, the alpha value is so set that the rate of blending between the original image and its defocused image is increased as the pixel has a larger difference between its Z value and the Z value of the focus of the virtual camera 10.

By so setting the alpha value, a more defocused image can be generated as the pixel is located farther apart from the focus of the virtual camera. This enables a so-called depth of field to be represented.

And yet, this embodiment is advantageous in that the processing load thereof is highly reduced since the Z value for each pixel can be transformed into the alpha value through only a single texture mapping using the LUT.

One of the alpha value setting techniques not using the LUT may be considered to be such a technique as shown in FIGS. 13A, 13B and 13C.

As shown in FIG. 13A, the alpha value of a deeper pixel from a virtual object OB1 (or polygon) having its Z value set as Z1 is updated by drawing it in a frame buffer. In other words, the alpha value of the deeper pixel from the object OB1 is updated by effectively using the hidden-surface removal based on the Z value.

Next, as shown in FIG. 13B, the alpha value for a deeper pixel from a virtual object OB2 having its Z value set at Z2 is updated by drawing it in the frame buffer. Similarly, as shown in FIG. 13C, the alpha value for a deeper pixel from a virtual object OB3 having its Z value set at Z3 is updated by drawing it in the frame buffer.

In such a manner, the alpha value of a pixel in the area AR1 can be set as $\alpha 1$; the alpha value of a pixel in the area AR2 can be set as $\alpha 2$; and the alpha value of a pixel in the area AR3 can be set as $\alpha 3$. In other words, the alpha value for each pixel can be set at a value corresponding to the Z value thereof.

However, this technique requires that the virtual object drawing process is repeated times corresponding to the number of threshold steps for Z value. For example, in FIG. 12, the drawing process should be repeated eight times. This is disadvantageous in that the drawing load is increased. On the contrary, if the number of threshold steps is reduced to relieve the drawing load, the boundary between the threshold Z values will be viewed as a stripe on the display screen, leading to reduction of the image quality.

According to the technique of this embodiment in which the Z value is transformed into the alpha value using the LUT, the Z values for all the pixels can be simultaneously be transformed into alpha values at a time. If the index number (entry) in the LUT is of 8 bits, the alpha values partitioned by 256 threshold Z value steps can be obtained. It can be prevented that the boundary between the threshold Z values will be viewed as a stripe on the display screen. Therefore, a high-quality image can be generated with reduced processing load.

2.4 Formation of 8-bit Z value

To improve the accuracy of the hidden-surface removal in the game system, the number of bits in the Z value is very large, such as 24 bits or 32 bits.

On the other hand, the number of bits in the index number (entry) of the index color texture-mapping LUT is smaller than that of the Z value, such as 8 bits.

Where the Z value is to be transformed into the alpha value using such an index color texture-mapping LUT as shown in FIG. 9, therefore, a pre-process in which the Z value is transformed into a Z value having the same number of bits as that of the LUT index number (which will be referred to Z2-value) is required. If the number of bits in the LUT index number is 8 bits, the Z value must be transformed into Z2-value (or second depth value) of 8 bits.

Figure 14:
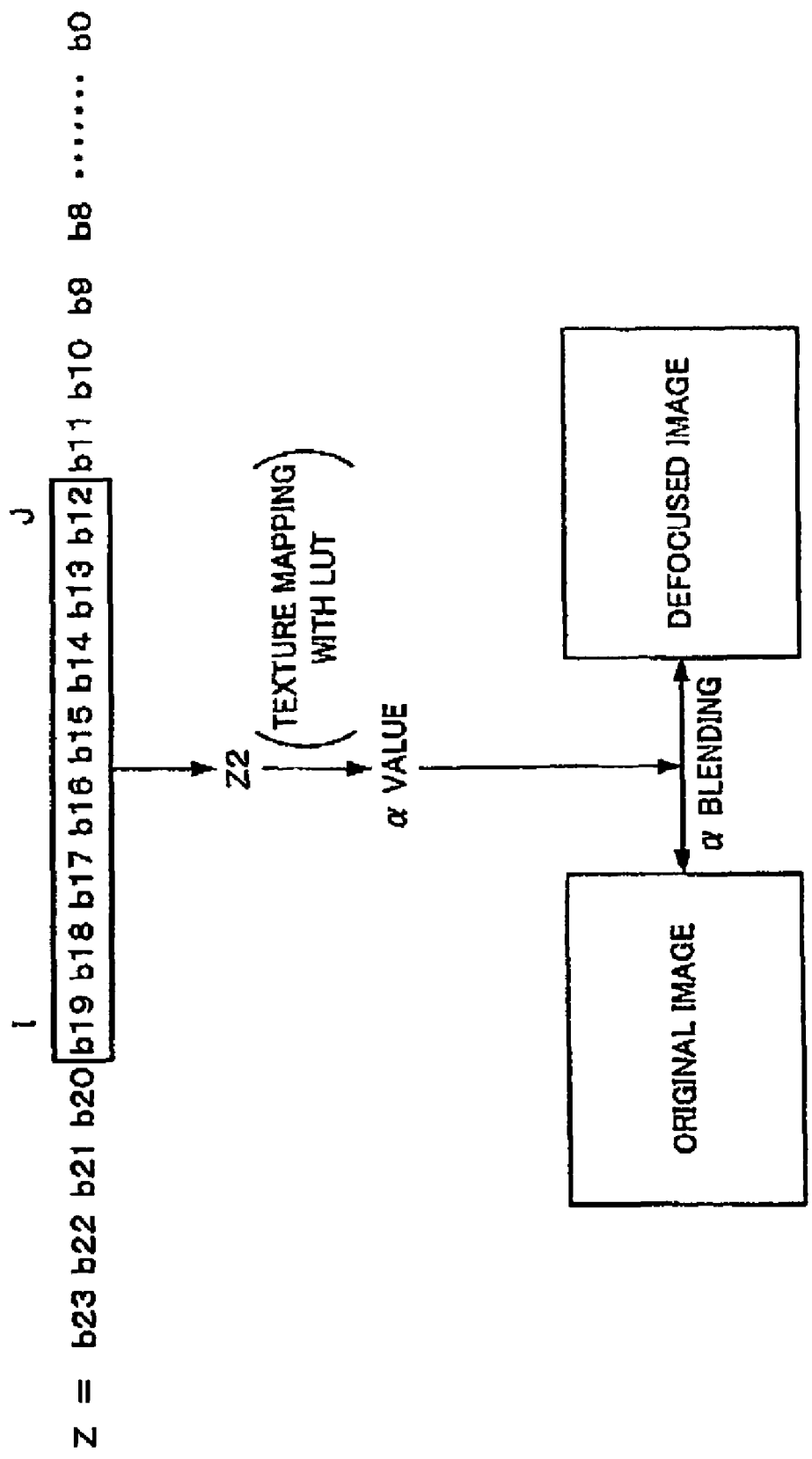
FIG. 14 illustrates a technique of transforming a Z-value into a Z2-value and transforming that Z2-value into an alpha value for blending an original image with its defocused image.

In this case, to obtain a consistent Z2-value, upper eight bits including the most-significant bit in the Z value must be used to form the Z2-value. In FIG. 14, eight bits ranging between bit 23 (or most-significant bit) and bit 16 is selected and used to form the Z2-value.

It has been found, however, that if the upper bits ranging between bit 23 and bit 16 in the Z value are used to form the Z2-value which is in turn transformed into the alpha value using the LUT, the number of partitions for alpha value will be reduced.

As shown in FIG. 15, for example, it is assumed that the Z value is of 4 bits and that the upper two bits of the Z value are selected and used to form the Z2-value. In this case, the alpha value will be partitioned into four threshold steps within all the range of Z=0 to 15.

However, an object in front of a screen SC (perspective-transformed screen) as shown at OB1 in FIG. 15 will usually be near-clipped. If an object located in a range of Z=10 to 15 in FIG. 15 is near-clipped, for example, it becomes rare that the most-significant bit in the Z value becomes one (1). In any event, the object as OB2 located near the screen SC is not required that its decree of defocusing is accurately controlled since it will necessarily be formed to be the most defocused image. Therefore, two steps of partitioning the portion as shown by G1 in FIG. 15 are unnecessary.

To avoid such a situation, this embodiment transforms the Z value (depth value) for each pixel in an original image into a Z2-value (second depth value) formed by lower bits I to J (e.g., bits 19 to 12) than the most-significant bit of the Z value, as shown in FIG. 14. This Z2-value is then set as an index number in the index color texture-mapping LUT and then performs the texture mapping for determining the alpha value for each pixel. Based on the determined alpha value for each pixel, alpha blending of the original image and its defocused image is carried out.

In such a manner, as shown in FIG. 16, the degree of defocusing can accurately be controlled by using the alpha values which are partitioned with the multi-step thresholds (four steps in FIG. 16) only relating to some objects (e.g., OB3 and OB4) that are located near the focus of the virtual camera 10 (or a gazing point). Thus, the quality of the generated image can be improved.

In this embodiment, the Z2-value may be clamped at a given value depending on the bit values other than the Z value bits I to J. More particularly, as shown in FIG. 16, the Z2-value may be clamped at the maximum value (which is, in a broad sense, a given value) when the upper bit in the Z value becomes one (1), for example. Thus, the Z2-value will be set maximum for any object which is not required to control its degree of defocusing accurately, such as OB1 or OB2. A consistent image can be generated even though the Z value has been transferred into the Z2-value formed by its bits I to J.

2.5 Transformation of Z value using LUT

This embodiment realizes the process of transforming the Z value described in connection with FIG. 14 into the Z2-value (transformation into 8-bit form) by using the index color texture-mapping LUT for the texture mapping. In other words, the Z value is transformed into the Z2-value by setting the Z value as an index number in an LUT and using that LUT to perform the index color texture-mapping relative to a virtual object.

Figure 17:
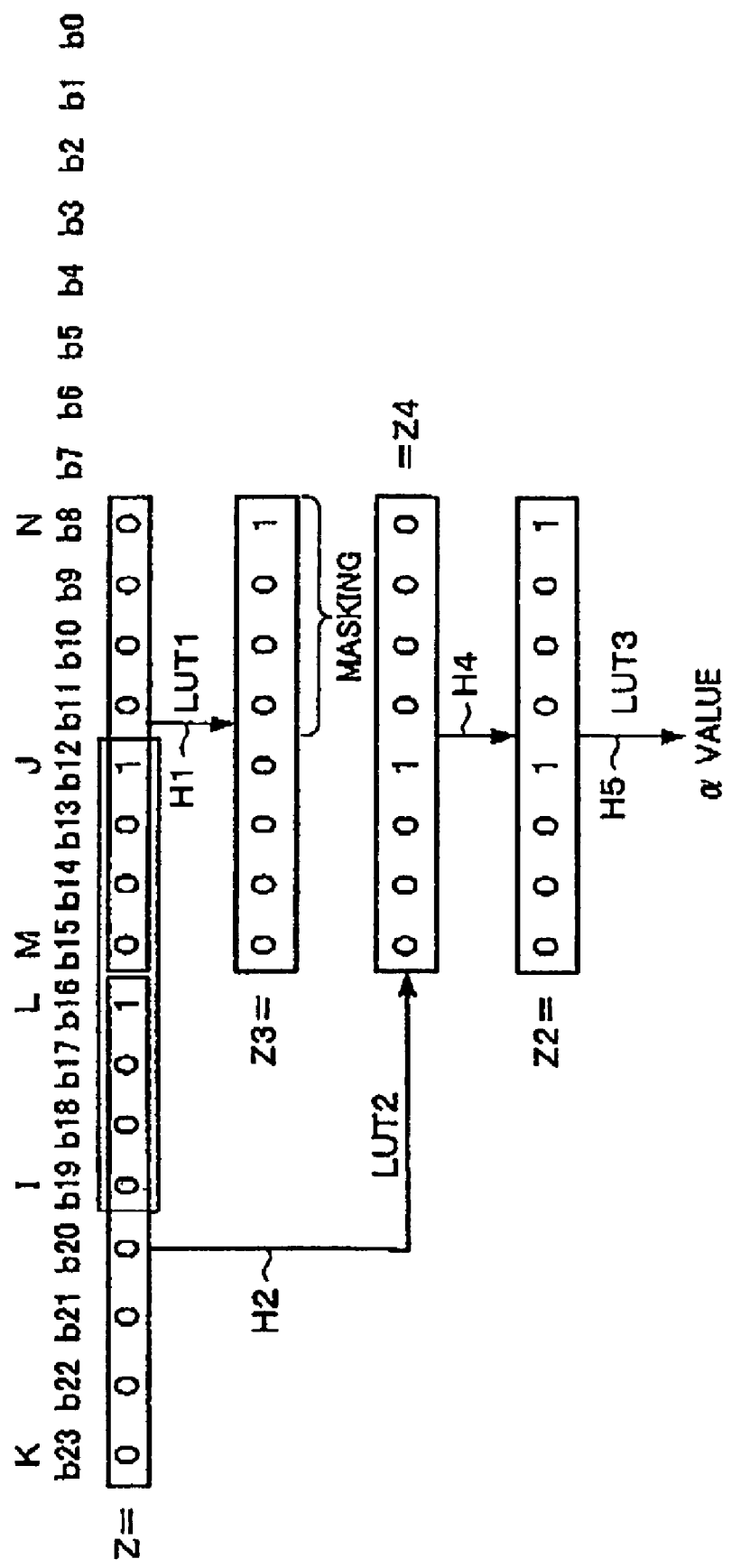
FIG. 17 illustrates a technique of using LUT to transform a Z-value into a Z2-value.

It is now assumed that a 24-bit Z value is transformed into a Z2-value using an LUT as shown in FIG. 17. In this case, as shown at H1 in FIG. 17, bits 15 to 8 (or M to N) in the Z value are set as index numbers in a first lookup table LUT1 which is in turn used to perform the index color texture-mapping for transforming the Z value into Z3-value (or third depth value).

Next, as shown at H2 in FIG. 17, bits 23 to 16 (or K to L) in the Z value are set as index numbers in a second lookup table LUT2 which is in turn used to perform the index color texture-mapping for transforming the Z value into Z4-value (or fourth depth value).

Finally, as shown at H4 in FIG. 17, these Z3- and Z4-values are used to determine Z2-value which is in turn transformed into alpha value by using a third lookup table LUT3 as shown at H5.

More particularly, the Z3-value obtained by the transformation of LUT1 is drawn in a drawing region (a frame buffer or an additional buffer). Thereafter, the Z4-value obtained by the transformation of LUT2 is drawn in the drawing region. At this time, the Z2-value is determined while the lower four bits (or effective bits) in the Z3-value are masked so that these bits will not be overwritten by the Z4-value.

The technique of FIG. 17 enables any 8 bits (which are, in a broad sense, I to J) in the Z value to be fetched.

If it is wanted to fetch 8 bits in the Z value for setting them as index numbers in the LUT, only 8 bits in the Z value within a predetermined range, such as bits 23 to 16, 15 to 8 or 7 to 0, may be fetched.

On the other hand, the type of 8 bits to be fetched in the Z value is determined depending on the range of near-clipping or the focus position of the virtual camera (or a gazing point), as described in connection with FIGS. 14 and 15.

If only 8 bits of the Z value within a predetermined range, such as bits 23 to 16, 15 to 8 or 7 to 0, can be fetched, an appropriate alpha value for most accurately controlling the degree of defocusing near the focus of the virtual camera cannot be provided.

For example, it is now assumed that if bits 19 to 12 in the Z value are fetched as Z2-value, the effective number of partitions (or the number of threshold values in the Z value) can be stepped into 256. In such a case, if only bits 23 to 16 or 15 to 8 in the Z value can be fetched, the effective number of partitions in the alpha value will be stepped into only 16, leading to reduction of the image quality.

On the contrary, if the technique of FIG. 17 is used, any bits I to J in the Z value can be fetched as Z2-value even though only 8 bits in the Z value within a predetermined range can be fetched as described above. Thus, the threshold values of the Z value for partitioning the alpha value can optimally be set depending on the range of near-clipping or the focus position of the virtual camera and an image with its improved quality can be generated.

Figures 20A, 20B:
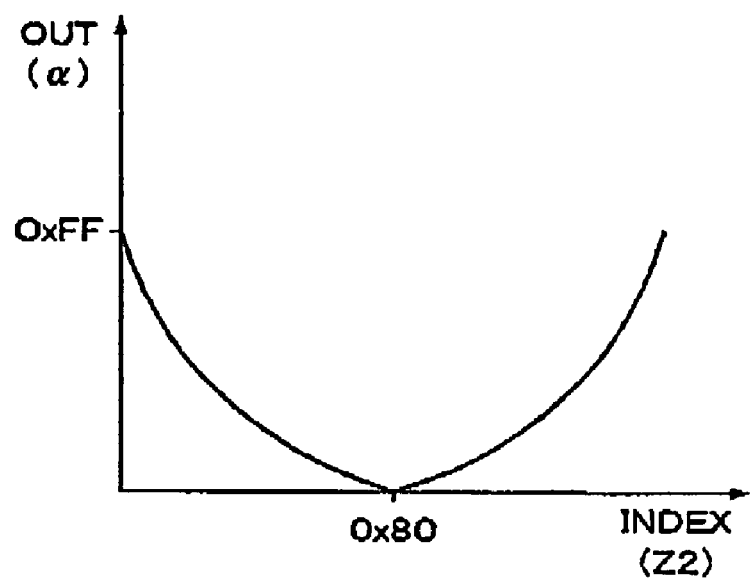
FIGS. 20A and 20B illustrate an example of LUT 3 for transformation of Z2-value into alpha value and its characteristic curve of transformation.

FIGS. 18, 19 and 20A shows examples of LUT1, LUT2 and LUT3. FIG. 20B shows a curve of transformation property in the LUT3 for transforming Z2-value into alpha value.

As shown in FIG. 18, the LUT1 in used to shift bits 15 to 8 (or M to N) of the Z value inputted as index numbers rightward by four bits. For example, 0×10 and 0×20 (hexadecimal notation) may be transformed into 0×01 and 0×02, respectively.

As shown in FIG. 19, the LUT2 in used to shift bits 23 to 16 (or K to L) of the Z value inputted as index numbers leftward by four bits. For example, 0×01 and 0×02 may be transformed into 0×10 and 0×20, respectively.

If the inputted Z value is larger than 0×0F, the output of the LUT2 is clamped at 0×F0, as shown at Q1 in FIG. 19.

Figure 21:
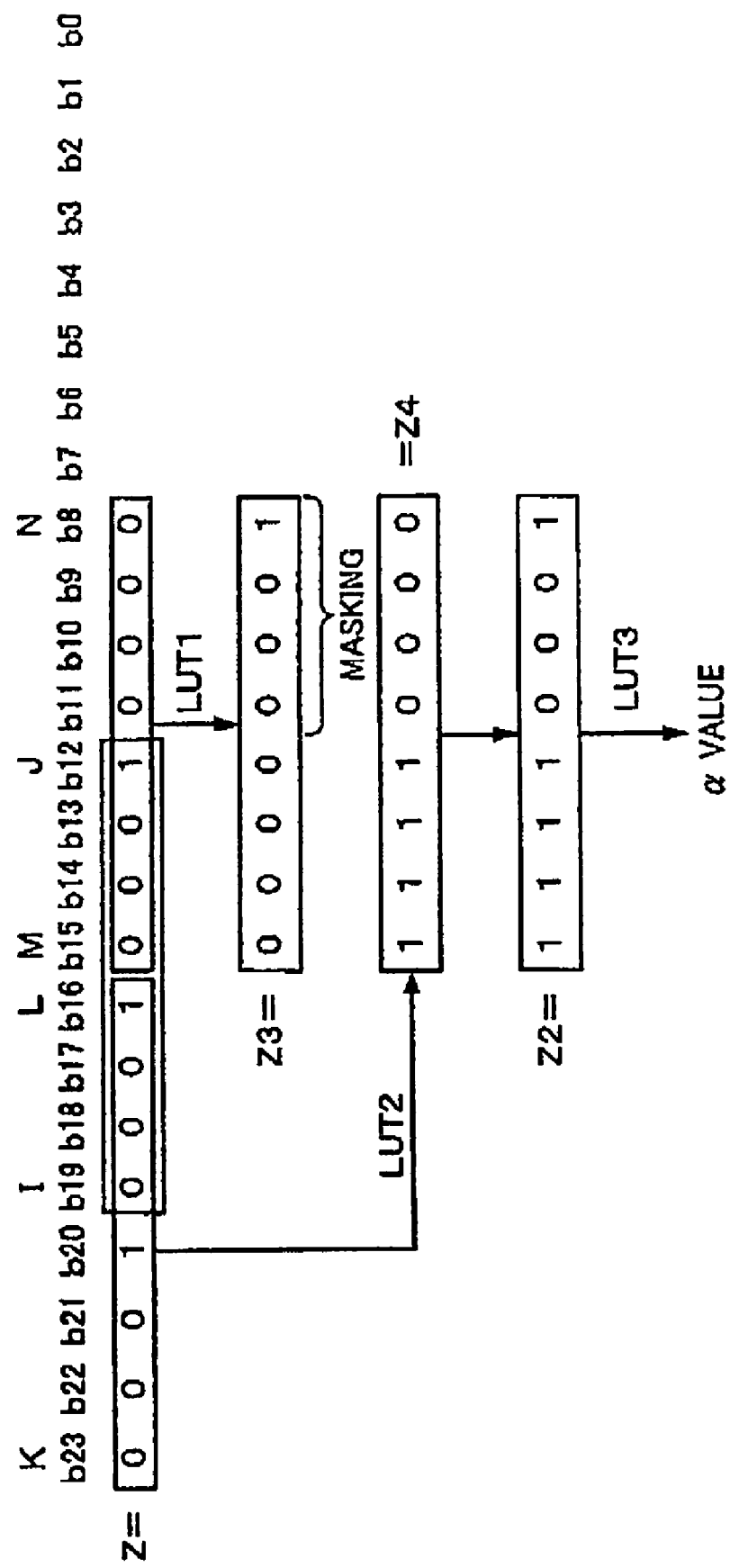
FIG. 21 illustrates the clamping process.

An example in which the Z value is clamped is shown in FIG. 21. Referring to FIG. 21, when bit 20 (or bit other than bits I to J) becomes one (1), the output of the LUT2 is clamped at 0×F0. Thus, Z2-value becomes 0×F1.

For example, if bits 19 to 12 in the Z value are directly fetched without clamping the output of the LUT2, the Z2-value will be 0×11, notwithstanding the bit 20 is one (1). This raises a problem in that the depth of field will wrongly be set.

The clamping of the LUT2 output can prevent such a problem and properly set the depth of field.

Moreover, the clamping of the LUT2 output will not provide any unnatural image since the degree of defocusing for the near-clipped object OB1 or the object OB2 located near the screen SC is only set maximum, as will be apparent from FIG. 16.

2.6 Generation of defocused image

This embodiment effectively uses the bilinear filtering type (or texel interpolation type) texture mapping to generate the defocused image (FIG. 11B) to be blended with the original image (FIG. 11A).

There may be produced a positional deviation between a pixel and a texel in the texture mapping.

Figure 22:
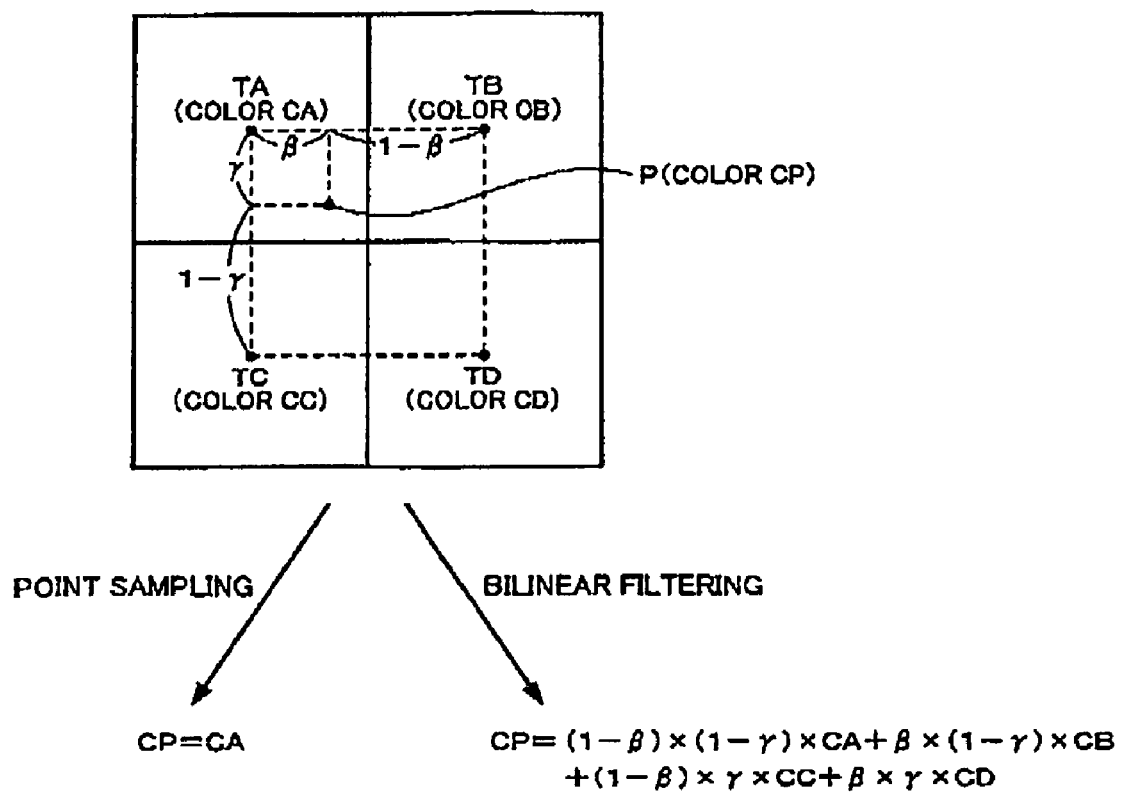
FIG. 22 illustrates the bilinear filtering type texture mapping.

In such a case, the point sampling type texture mapping renders the color CP (which is, in a broad sense, image information) at a pixel P (or sampling point) the color CA at a texel TA nearest the point P, as shown in FIG. 22.

On the other hand, the bilinear filtering type texture mapping provides the color CP of the point P which are interpolated by the colors CA, CB, CC and CD of texels TA, TB, TC and TD surrounding the point P.

More particularly, coordinate ratio in X-axis direction $\beta:1-\beta$ ($0 \leq \beta \leq 1$), and coordinate ratio in Y-axis direction $\gamma:1-\gamma$ ($0 \leq \gamma \leq 1$) are determined based on the coordinates of TA to TD and P.

In this case, the color CP of the point P (or the output color in the bilinear filtering) may be represented by the following formula:

$$CP=(1-\beta)\times(1-\gamma)\times CA+\beta\times(1-\gamma)\times CB+(1-\beta)\times\gamma\times CC+\beta\times\gamma\times CD \qquad (8)$$

This embodiment aims at the fact that the bilinear filtering type texture mapping automatically interpolates the colors, thereby generating a defocused image.

Figure 23:
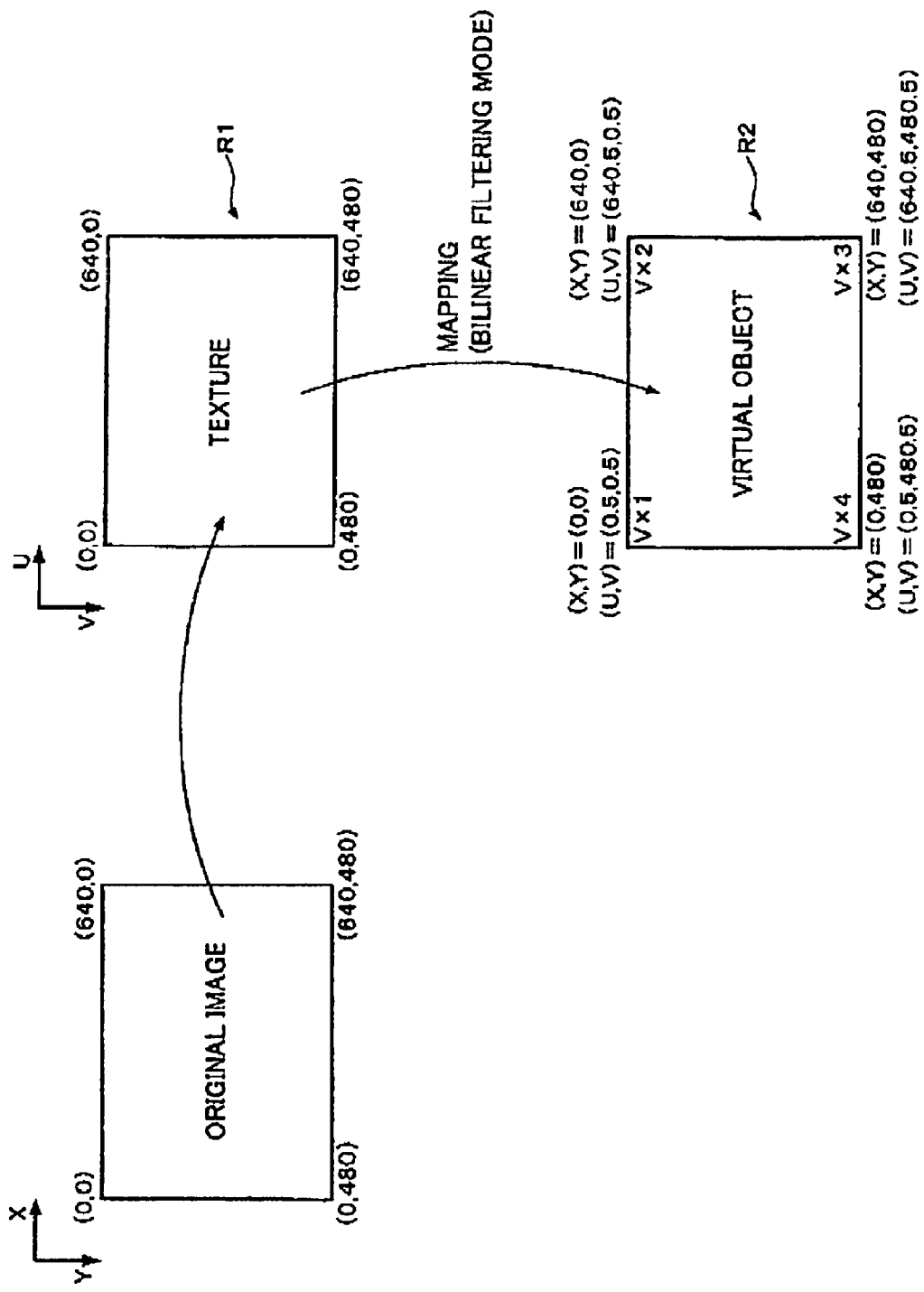
FIG. 23 illustrates a technique of generating a defocused image by effectively using the bilinear filtering mode.

More particularly, as shown at R1 in FIG. 23, an original image drawn in a frame buffer may be set as a texture. When this texture (or original image) is to be mapped on a virtual object through the bilinear filtering type texture mapping, texture coordinates given to the vertexes of the virtual object are shifted (dislocated or moved) rightward and downward, for example, by (0.5, 0.5). In such a manner, a defocused image in which the colors of the pixels in the original image spread into the surrounding pixels can automatically be generated through the bilinear filtering type interpolation.

If it is wanted to defocus the entire screen, the shape of a virtual object onto which the texture (or original image) is mapped is set to be equal to that of a screen (or a region to be defocused). For example, if the vertex coordinates of the screen are (X, Y)=(0, 0), (640, 0), (640, 480), (0, 480), the vertex coordinates of the virtual object are also (X, Y)=(0, 0), (640, 0), (640, 480), (0, 480).

In this case, if texture coordinates (U, V) given to the vertexes VX1, VX2, VX3 and VX4 of the virtual object are respectively set at (0, 0), (640, 0), (640, 480), (0, 480), the positions of the pixels in the screen will be identical with the positions of the texels in the texture. Therefore, the image will not be defocused.

On the contrary, if texture coordinates (U, V) given to the vertexes VX1, VX2, VX3 and VX4 of the virtual object are respectively set at (0.5, 0.5), (640.5, 0.5), (640.5, 480.5), (0.5, 480.5), the positions of the pixels in the screen will not be identical with the positions of the texels in the texture. Thus, the color interpolation will be executed to provide a defocused image through the bilinear filtering type interpolation.

If it is wanted to defocus part of the screen, the shape of the virtual object may become equal to that of its defocused region.

Figure 24:
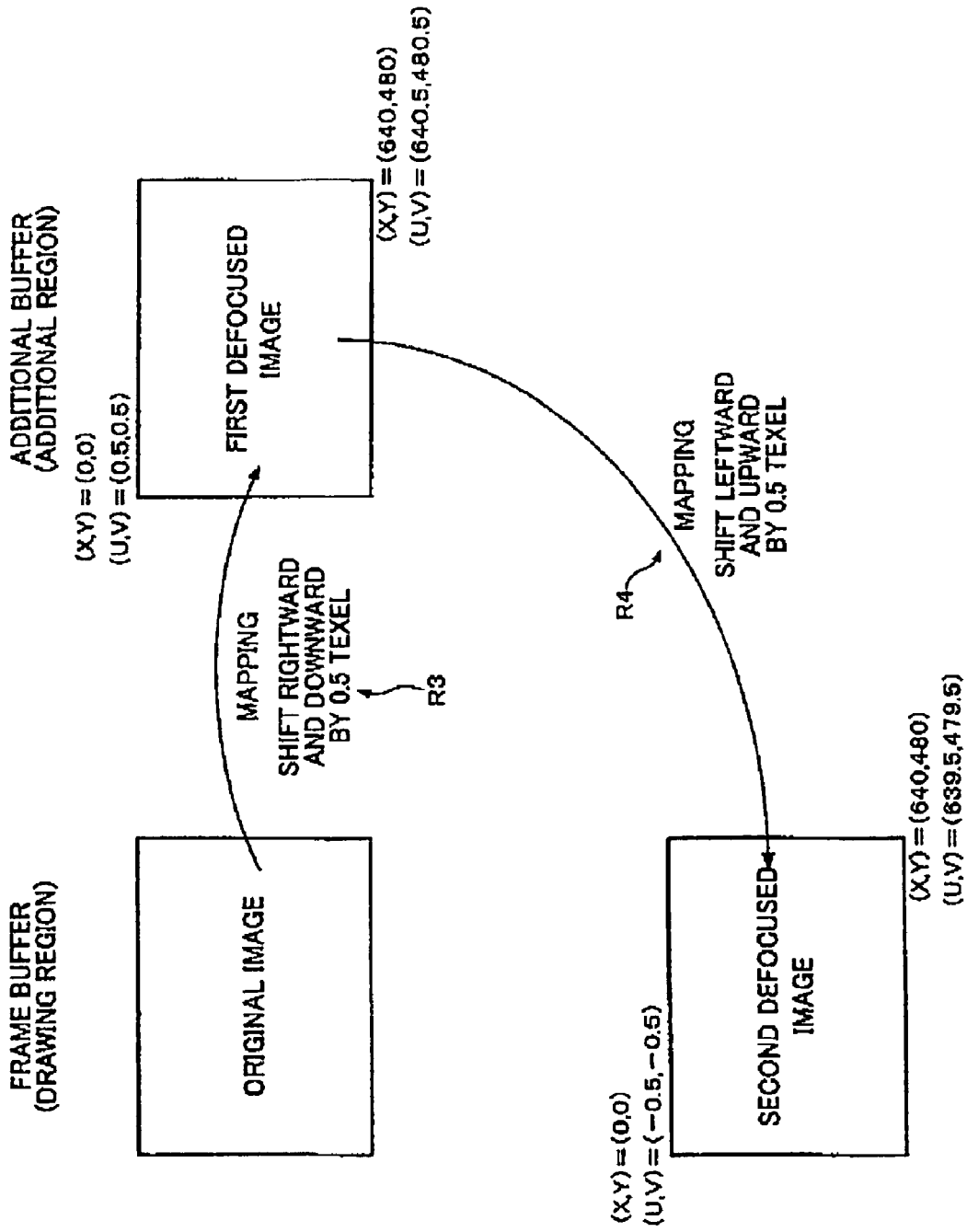
FIG. 24 also illustrates a technique of generating a defocused image by effectively using the bilinear filtering mode.

As shown at R3 in FIG. 24, this embodiment a first defocused image by setting the original image as a texture and shifting it in the rightward and downward direction (first shift direction) by 0.5 for performing the bilinear filtering type in texture mapping. Next, as shown at R4 in FIG. 24, the first defocused image is then set as another texture and shifted by 0.5 in the leftward and upward direction (second shift direction). The bilinear filtering type texture mapping is then executed to generate a second defocused image. Alternatively, the aforementioned procedure (or shifting in the rightward and downward directions and in the leftward and upward directions) may be repeated several times. Thus, a more natural and more defocused image can be generated.

The principle of generating the defocused image through the bilinear filtering type interpolation will be described below.

Figure 25A:
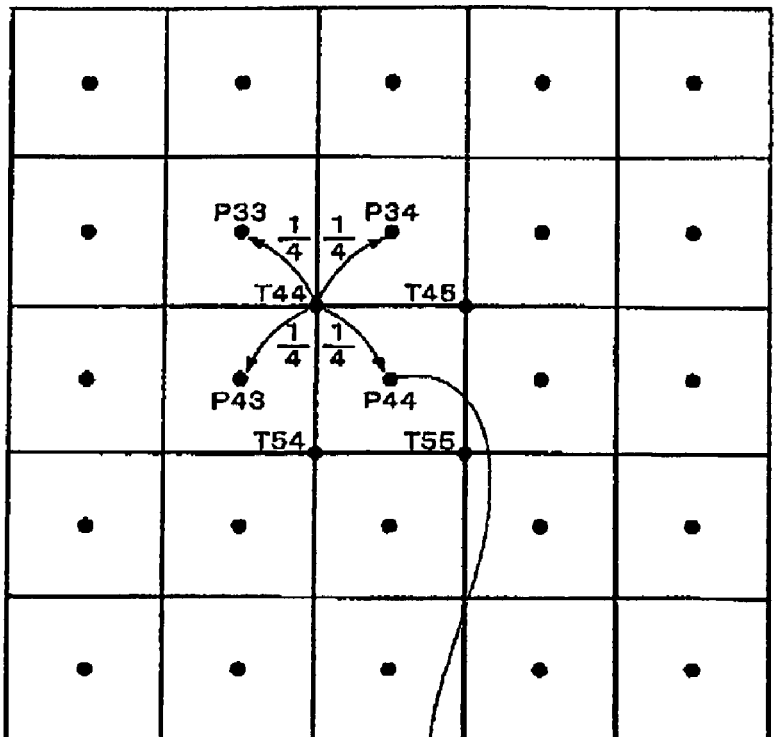
FIGS. 25A and 25B illustrate a principle of generating a defocused image through the bilinear filtering type interpolation.

For example, it is now assumed as shown in FIG. 25A that the bilinear filtering type texture mapping is carried out after the texture coordinates are shifted by 0.5 texels in the rightward and downward direction. In this case, $\beta=\gamma=1/2$ in the above formula (8). Therefore, if the colors in texels T44, T45, T54 and T55 are respectively made C44, C45, C54 and C55, the color CP44 of a pixel P44 may be represented by the following formula:

$$CP44=(C44+C45+C54+C55)/4 \quad (9)$$

As will be apparent from the foregoing, the color C44 of the texel T44 (which corresponds to the original color of the pixel P44 in the original image before transformation) will spread into the surrounding pixels P33, P34, P43 and P44 by each ¼ through the transformation shown in FIG. 25A.

Figure 25B:
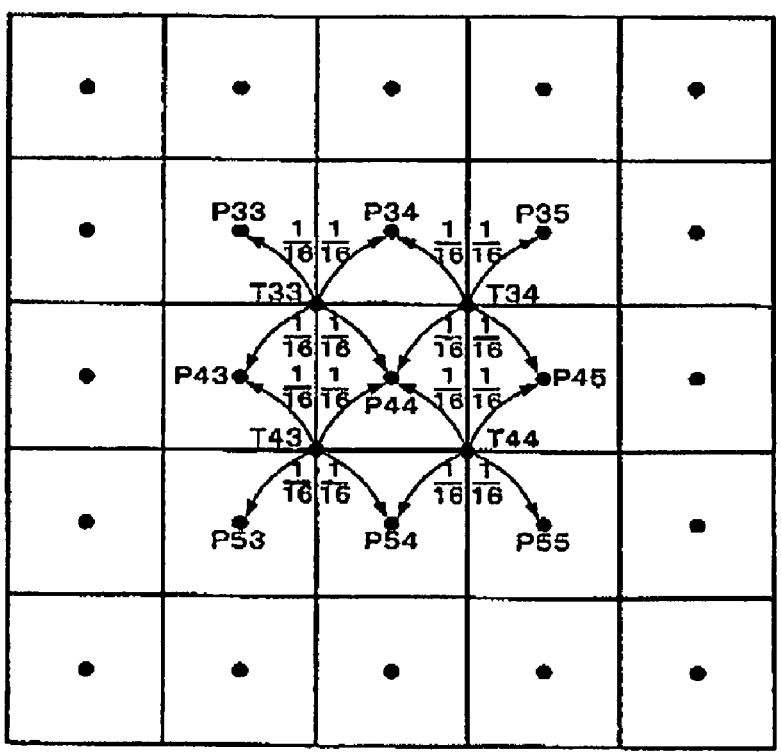

Thereafter, as shown in FIG. 25B, the image obtained in FIG. 25A is set as a texture, the coordinates of which are then shifted by 0.5 in the leftward and upward direction for performing the bilinear filtering type texture mapping. In this case, the pixels P33, P34, P43 and P44 in FIG. 25A will correspond to the texels T33, T34, T43 and T44 in FIG. 25B. The color C44 spread into the P33, P34, P43 and P44 (T33, T34, T43 and T44) by each ¼ in FIG. 25A is then magnified further ¼ and will spread into the four surrounding pixels. Eventually, the original color C44 of T44 will spread into the surrounding area by ¹⁄₁₆=¼×¼.

Thus, the color C44 (which corresponds to the original color of the pixel P44 in the original image drawn in the frame buffer) will spread into the pixels P33, P34 and P35 respectively by ¹⁄₁₆, ²⁄₁₆ and ¹⁄₁₆ through the transformations of FIGS. 25A and 25B. Furthermore, the color C44 will spread into the pixels P43, P44 and P45 respectively by ²⁄₁₆, ⁴⁄₁₆ and ²⁄₁₆ and into the pixels P53, P54 and P55 respectively by ¹⁄₁₆, ²⁄₁₆ and ¹⁄₁₆.

As a result, such a plane filter as shown in FIG. 26A will be applied to the original image through the transformations of FIGS. 25A and 25B. Such a plane filter can uniformly spread the color of each pixel in the original image into the surrounding area. This can generate an ideal defocused image of the original image.

If the set of transformations in FIGS. 25A and 25B are repeated two times, such a plane filter as shown in FIG. 26B will be applied to the original image. Such a plane filter can generate a more ideal defocused image than that of FIG. 26A.

3. Detailed processing in the embodiment

Figure 27:
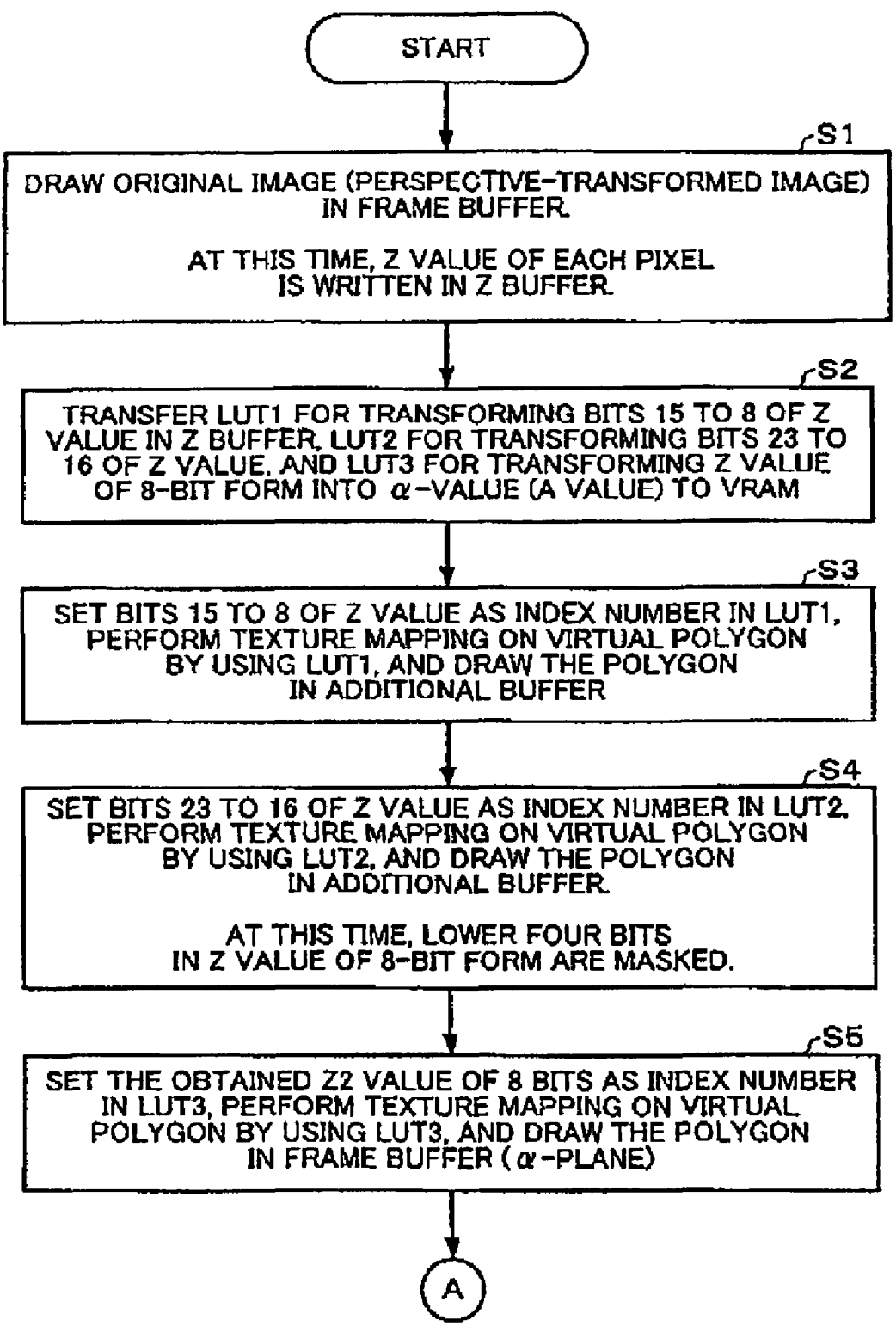
FIG. 27 is a flowchart illustrating the detailed process of this embodiment.
Figure 28:
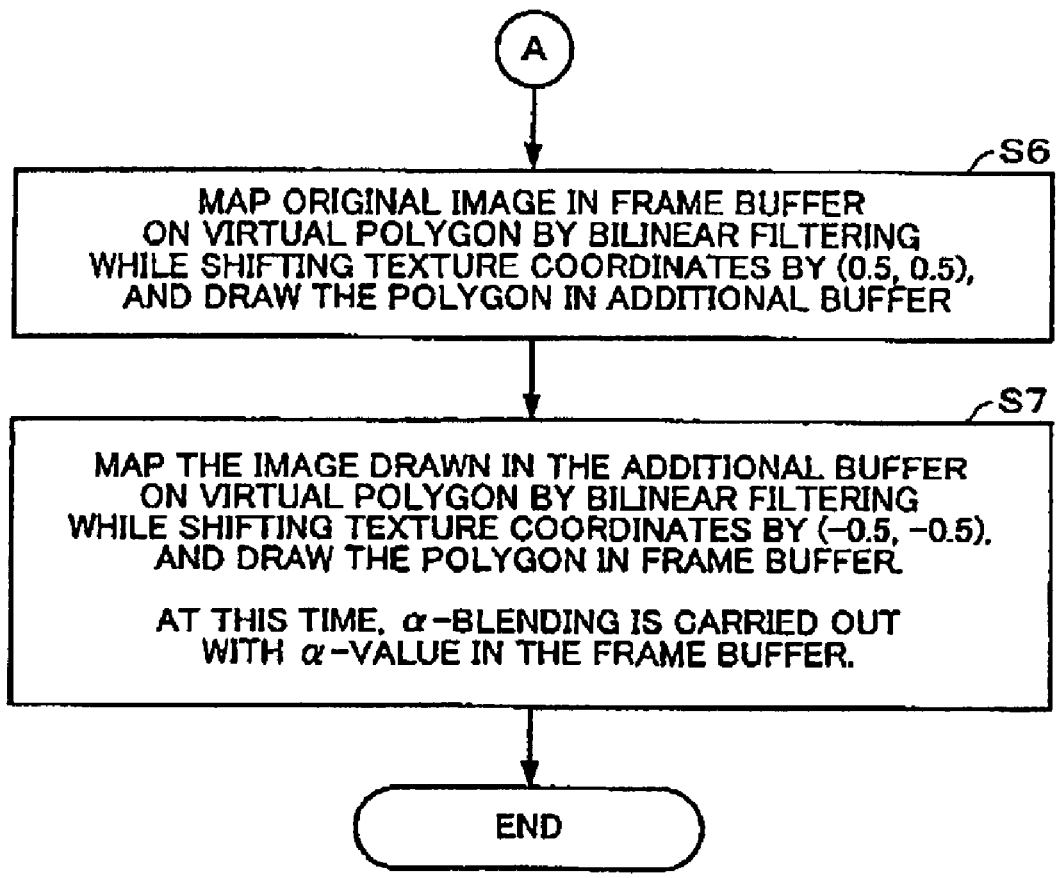
FIG. 28 is a flowchart illustrating the detailed process of this embodiment.

The details of the processing according to the embodiment of the present invention will be described in connection with flowcharts of FIGS. 27 and 28.

First of all, an original image (or perspective-transformed image) is drawn in a frame buffer (step S1). At this time, Z-value for each pixel will be written into a Z buffer.

LUT1 (FIG. 18) for transforming the bits 15 to 8 of the Z-value in the Z buffer, LUT2 (FIG. 19) for transforming the bits 23 to 16 and LUT3 (FIG. 20A) for transforming the Z-value of 8-bit form into alpha values (A values) are then transferred to VRAM (step S2).

Next, the bits 15 to 8 of the Z-value is set as an index number in LUT1 which is in turn used to perform the texture mapping on a virtual polygon. This virtual polygon is then drawn in an additional buffer (step S3).

Next, the bits 23 to 16 of the Z-value is set as an index number in LUT2 which is in turn used to make the texture mapping on a virtual polygon. This virtual polygon is then drawn in an additional buffer (step S4). At this time, the lower four bits (data effective bits) in the Z-value of 8-bit form are masked not to be overwritten.

Next, the 8-bit Z2-value obtained at the step S4 is set as an index number in LUT3 which is in turn used to make the texture mapping on a virtual polygon. This virtual polygon is drawn in the frame buffer (alpha plane) (step S5).

Next, the original image drawn in the work buffer at the step S1 is mapped on a virtual polygon through the bilinear filtering mode while sifting the texture coordinates (U, V) by (0.5, 0.5). This virtual polygon is drawn in an additional buffer (step S6).

Next, the image drawn in the additional buffer at the step S6 is mapped on a virtual polygon through the bilinear filtering mode while sifting the texture coordinates (U, V) by (−0.5, −0.5). This virtual polygon is drawn in the frame buffer (step S7). At this time, the alpha blending is carried out by using the alpha value drawn in the frame buffer at the step S5 to blend the original image with its defocused image.

In such a manner, a so-called depth of field can be represented.

4. Hardware configuration

Figure 29:
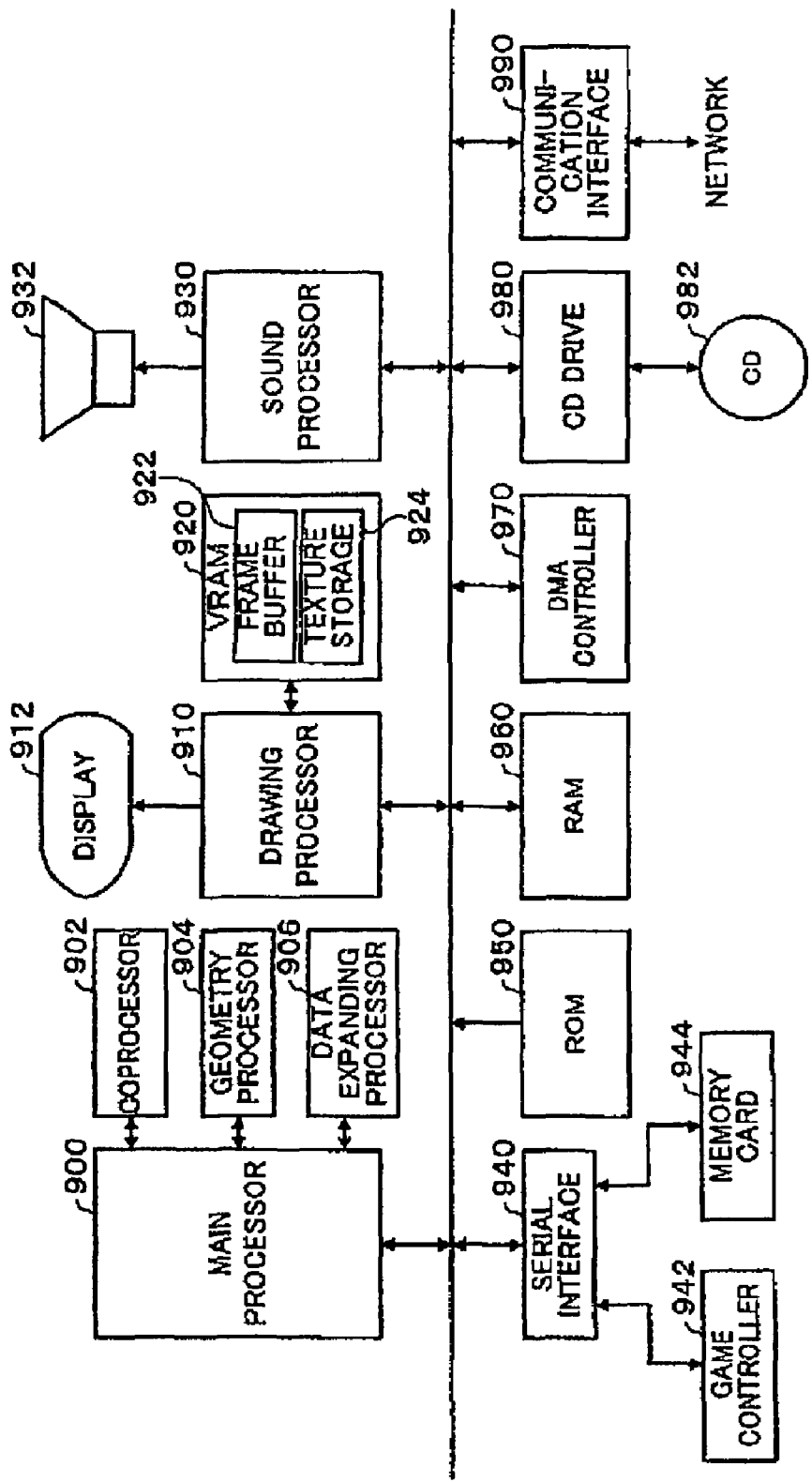
FIG. 29 shows a structure of hardware in which this embodiment can be realized.

Hardware configuration which can realize this embodiment is shown in FIG. 29.

A main processor 900 operates to execute various types of processing such as game processing, image processing, sound processing and other processing according to a program stored in a CD (information storage medium) 982, a program transferred through a communication interface 990 or a program stored in a ROM (information storage medium) 950.

A coprocessor 902 is to assist the processing of the main processor 900 and has a product-sum operator and analog divider which can perform high-speed parallel calculation to execute a matrix (or vector) calculation at high speed. If a physical simulation for causing an object to move or act (motion) requires the matrix calculation or the like, the program running on the main processor 900 instructs (or asks) that processing to the coprocessor 902.

A geometry processor 904 performs geometry processing such as coordinate transformation, perspective transformation, light source calculation, curve formation or the like and has a product-sum operator and analog divider which can perform high-speed parallel calculation to execute a matrix (or vector) calculation at high speed. For example, for the coordinate transformation, perspective transformation or light source calculation, the program running on the main processor 900 instructs that processing to the geometry processor 904.

A data expanding processor 906 performs a decoding process for expanding compressed image and sound data or a process for accelerating the decoding process in the main processor 900. In the opening, intermission, ending or game screen, thus, an MPEG compressed animation may be displayed. The image and sound data to be decoded may be stored in the storage devices including ROM 950 and CD 982 or may externally be transferred through the communication interface 990.

A drawing processor 910 is to draw or render an object constructed by primitive surfaces such as polygons or curved faces at high speed. On drawing the object, the main processor 900 uses a DMA controller 970 to deliver the object data to the drawing processor 910 and also to transfer a texture to a texture storage section 924, if necessary. Thus, the drawing processor 910 draws the object in a frame buffer 922 at high speed while performing hidden-surface removal by the use of a Z-buffer or the like, based on the object data and texture. The drawing processor 910 can also perform alpha blending (or translucency processing), depth cueing, mip-mapping, fogging, bilinear filtering, trilinear filtering, anti-aliasing, shading and so on. As the image for one frame has been written into the frame buffer 922, that image is displayed on a display 912.

A sound processor 930 includes any multi-channel ADPCM sound source or the like to generate high-quality game sounds such as BGMs, sound effects and voices. The generated game sounds are outputted through a speaker 932.

The operational data from a game controller 942, saved data from a memory card 944 and personal data may externally be transferred through a serial interface 940.

ROM 950 has stored a system program and so on. For an arcade game system, the ROM 950 functions as an information storage medium in which various programs have been stored. The ROM 950 may be replaced by any suitable hard disk.

RAM 960 is used as a working area for various processors.

DMA controller 970 is to control the DMA transfer between processors and memories (RAM, VRAM, ROM and so on).

CD controller 980 drives a CD (information storage medium) 982 in which the programs, image data or sound data have been stored and enables these programs and data to be accessed.

The communication interface 990 performs data transfer between the game system and any external instrument through a network. In such a case, the network connectable with the communication interface 990 may take any of communication lines (analog phone line or ISDN) or high-speed serial bus. The use of the communication line enables the data transfer to be performed through the internet. If the high-speed serial interface bus is used, the data transfer may be carried out between the game system and any other game system.

All the means of the present invention may be realized (executed) only through hardware or only through a program which has been stored in an information storage medium or which is distributed through the communication interface. Alternatively, they may be executed both through the hardware and program.

If all the means of the present invention are executed both through the hardware and program, the information storage medium will have stored a program for realizing the respective means of the present invention through the hardware. More particularly, the aforementioned program instructs the respective processors 902, 904, 906, 910 and 930 which are hardware and also delivers the data to them, if necessary. Each of the processors 902, 904, 906, 910 and 930 will execute the corresponding one of the means of the present invention based on the instruction and delivered data.

Figure 30A:
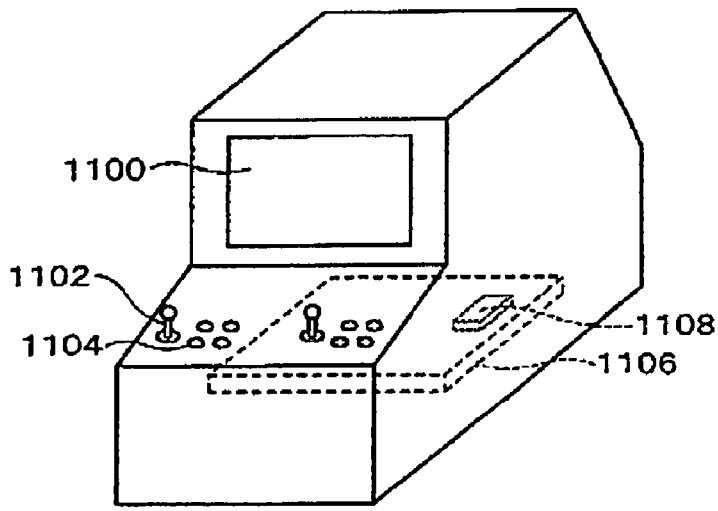
FIGS. 30A, 30B and 30C show various systems to which this embodiment can be applied.

FIG. 30A shows an arcade game system to which this embodiment is applied. Players enjoy a game by controlling levers 1102 and buttons 1104 while viewing a game image displayed on a display 1100. A system board (circuit board) 1106 included in the game system includes various processors and memories mounted thereon. Information (program or data) for realizing all the means of the present invention has been stored in a memory 1108 on the system board 1106, which is an information storage medium. Such information will be referred to "stored information" later.

Figure 30B:
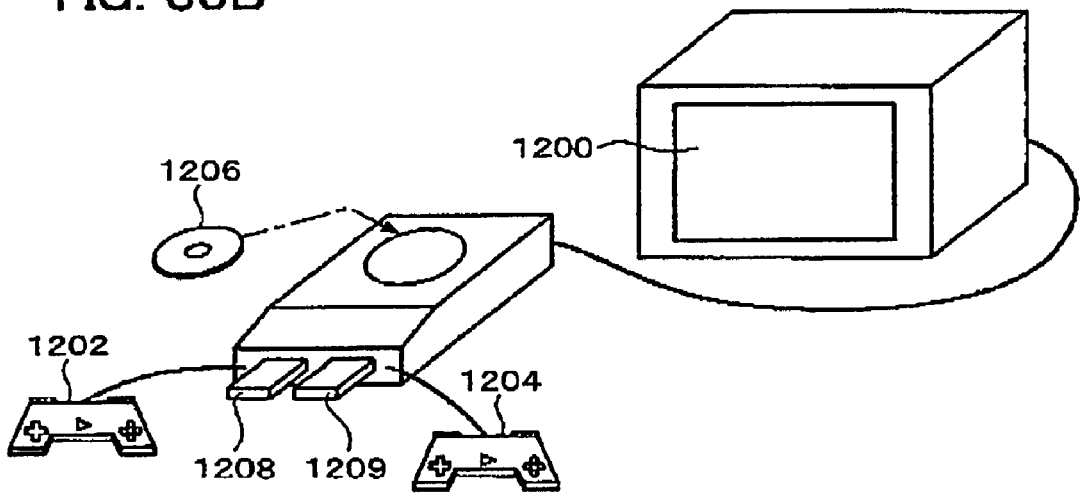

FIG. 30B shows a domestic game apparatus to which this embodiment is applied. A player enjoys a game by manipulating game controllers 1202 and 1204 while viewing a game picture displayed on a display 1200. In such a case, the aforementioned stored information has been stored in DVD 1206 and memory cards 1208, 1209 which are detachable information storage media in the game system body.

Figure 30C:
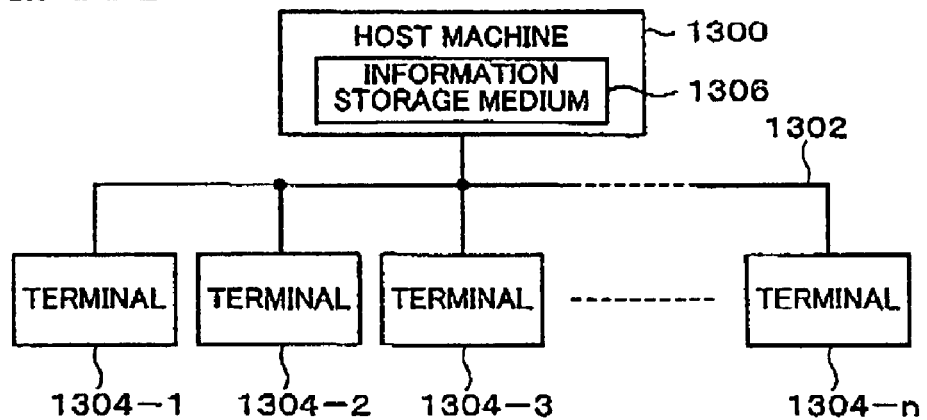

FIG. 30C shows an example wherein this embodiment is applied to a game system which includes a host machine 1300 and terminals 1304-1 to 1304-n (game devices or portable telephones) connected to the host machine 1300 through a network (which is a small-scale network such as LAN or a global network such as INTERNET) 1302. In such a case, the above stored information has been stored in an information storage medium 1306 such as magnetic disk device, magnetic tape device, semiconductor memory or the like which can be controlled by the host machine 1300, for example. If each of the terminals 1304-1 to 1304-n generates game images and game sounds in a stand-alone manner, the host machine 1300 delivers the game program and other data for generating game images and game sounds to the corresponding terminal 1304-1 to 1304-n. On the other hand, if the game images and sounds cannot be generated by the terminals in the stand-alone manner, the host machine 1300 will generate the game images and sounds which are in turn transmitted to the terminals 1304-1 to 1304-n.

In the arrangement of FIG. 30C, the means of the present invention may be decentralized into the host machine (or server) and terminals. The above information for realizing the respective means of the present invention may be distributed and stored into the information storage media of the host machine (or server) and terminals.

Each of the terminals connected to the network may be either of home or arcade type. When the arcade game systems are connected to the network, it is desirable that each of the arcade game systems includes a portable information storage device (memory card or portable game machine) which can not only transmit the information between the arcade game systems but also transmit the information between the arcade game systems and the domestic game systems.

The present invention is not limited to the things described in connection with the above forms, but maybe carried out in any of various other forms.

For example, part of the structural requirements in any of claims having dependent claims of the invention can be omitted. Primary part of an independent claim of the invention can be made dependent on any other independent claim.

This embodiment has been described as to the set alpha values which are used to perform alpha blending of the original image and its defocused image for implementing the representation of the depth of field. However, the image representation using the alpha values set by the technique of the present invention is not limited to such an image representation of the depth of field. For example, the set alpha values may be used to carry out alpha blending of the color of the original image and a given color (e.g., background color or target color), to change the brightness or chroma in the original image, to perform alpha blending of the original image and a given other image, or to perform alpha blending of the original image with its transformed image.

Although it is particularly desirable that the transformation of the depth value into the second depth value is realized through the technique of using the index color texture-mapping lookup table as described in connection with FIG. 17, it may be realized by any other suitable technique.

The technique of setting the alpha value depending on the second depth value may be any of various techniques such as the technique of using the index color texture-mapping lookup table as described in connection with FIGS. 4 and 9 or the technique of sequentially drawing the virtual objects to update the alpha values in the pixels deeper or nearer from the virtual objects in the sequential manner as described in connection with FIG. 13.

The fetching of any bits I to J in the depth value has been described in connection with FIG. 21. However, the technique of FIG. 21 may also broadly be applied to the fetching of any bits I to J in any image information other than the depth value (e.g., information relating to color or alpha value, drawn in the drawing region).

The transformation property of the lookup table is not limited to those shown in FIGS. 18, 19, 20A and 20B, but may be carried out in any of various other forms.

It is particularly desirable that the defocused image to be blended with the original image is generated through the technique described in connection with FIGS. 23 and 24. However, the present invention is not limited to such a technique. For example, the defocused image may generated by blending the original image with an image formed by shifting the original image or by blending the original image in the present frame with the original image in the previous frame.

The generation of the defocused image through the texel interpolation is not limited to those described in connection with FIGS. 23 to 26B. For example, a region to be defocused that is smaller than the screen may be set. The original image on that smaller region may only be defocused, rather than the entire screen.

Although this embodiment has been described as the depth value increased as the corresponding pixel is located nearer the viewpoint, the depth value may be increased as the corresponding pixel is located farther apart from the viewpoint.

The present invention may similarly be applied to any of various other games such as fighting games, shooting games, robot combat games, sports games, competitive games, roll-playing games, music playing games, dancing games and so on.

Furthermore, the present invention can be applied to various image generating systems such as arcade game systems, domestic game systems, large-scaled multi-player attraction systems, simulators, multimedia terminals, image generating systems, game image generating system boards and so on.

The invention claimed is:

1. A game system which executes a computer program to generate an electronic image to provide more realistic view on a display screen, comprising:
    means which transforms a depth value, comprising a plurality bits, of each pixel of an original image into a second depth value or an alternative second depth value, both being formed of the lower bits I to J of the depth value which are positioned lower than a most significant bit of the depth value;
    means which sets an alpha value of each pixel to a value corresponding to the second depth value or the alternative second depth value;
    means which generates the electronic image based on the set alpha value, wherein the bits I to J are an intermediate set of bits, and are below the uppermost bit and above the lowermost bit of the depth value,
    wherein, when the depth value is within a predetermined range, the depth value is transformed into the second depth value, and, when the depth value is outside of the predetermined range, the depth value is transformed into the alternative second depth value,
        the predetermined range includes a depth value of a focus position of a virtual camera, and
        a number of threshold steps of the second depth value is greater than a number of threshold steps of the alternative second depth value.

2. The game system as defined in claim 1,
wherein the original image is blended with a defocused image of the original image based on the alpha value set for each pixel.

3. The game system as defined in claim 2,
wherein the defocused image of the original image is generated by setting the original image as a texture and shifting texture coordinates of a virtual object when the texture is mapped onto the virtual object by texel interpolation method.

4. The game system as defined in claim 1,
wherein the alternative second depth value is clamped into a given value depending on a bit value other than the bits I to J in the depth value.

5. The game system as defined in claim 1,
wherein the depth value is set as an index number in a lookup table for index color texture-mapping; and
wherein the depth value is transformed into the second depth value or the alternative second depth value by performing index color texture-mapping on a virtual object by using the lookup table.

6. The game system as defined in claim 1, wherein:
bits M to N in the depth value are set as an index number in a first lookup table for index color texture-mapping;
the depth value is transformed into a third depth value by performing index color texture-mapping on a virtual object by using the first lookup table;
bits K to L (where K≧I≧L>M≧J≧N) in the depth value are set as an index number in a second lookup table for index color texture-mapping;
the depth value is transformed into a fourth depth value by performing index color texture-mapping on a virtual object by using the second lookup table; and
the third and fourth depth values are used to determine the second depth value or the alternative second depth value.

7. A game system which executes a computer program to generate an electronic image to provide more realistic view on a display screen, comprising:
    means which sets bits M to N in given image information as an index number in a first lookup table for index color texture-mapping, and uses the first lookup table to perform index color texture-mapping on a virtual object to transform the image information into third image information;
    means which sets bits K to L in the image information as an index number in a second lookup table for index color texture-mapping, and uses the second lookup table to perform index color texture-mapping on a virtual object to transform the image information into fourth image information; and means which transforms the image information into second image information or alternative second image information formed of the bits I to J (where K≧I≧L>M≧J≧N) in the image information based on the third and fourth image information, wherein, when a depth value, which is one of the image information, is within a predetermined range, the image information is transformed into the second image information and, when a depth value, which is one of the image information, is outside of the predetermined range, the image information is transformed into the alternative second image information, the predetermined range includes a depth value of a focus position of a virtual camera, and a number of threshold steps of the second image information is greater than a number of threshold steps of the alternative second image information.

8. The game system as defined in claim 5,
wherein the virtual object is a polygon having a size equal to a size of the display screen.

9. The game system as defined in claim 7,
wherein the virtual object is a polygon having a size equal to a size of the display screen.

10. The game system as defined in claim 5,
wherein the virtual object is a polygon having a size equal to a size of a block obtained by dividing the display screen into blocks.

11. The game system as defined in claim 7,
wherein the virtual object is a polygon having a size equal to a size of a block obtained by dividing the display screen into blocks.

12. A computer-usable program embodied on an information storage medium or in a computer-executable signal capable of being transmitted by a transmitter and received by a receiver to generate an electronic image on a display screen, comprising a processing routine for a computer to realize:

means which transforms a depth of value, comprising a plurality bits, of each pixel of an original image into a second depth value and an alternative second depth value, both formed of the lower bits I to J of the depth value which are positioned lower than a most significant bit of the depth value;

means which sets an alpha value of each pixel to a value corresponding to the second depth value or the alternative second depth value;

means which generates an image based on the set alpha value, wherein the bits I to J are an intermediate set of bits, and are below the uppermost bit and above the lowermost bit of the depth value, wherein, when the depth value is within a predetermined range, the depth value is transformed into the second depth value, and, when the depth value is outside of the predetermined range, the depth value is transformed into the alternative second depth value, the predetermined range includes a depth value of a focus position of a virtual camera, and a number of threshold steps of the second depth value is greater than a number of threshold steps of the alternative second depth value.

13. The program as defined in claim 12,
wherein the original image is blended with a defocused image of the original image based on the alpha value set for each pixel.

14. The program as defined in claim 13,
wherein the defocused image of the original image is generated by setting the original image as a texture and shifting texture coordinates of a virtual object when the texture is mapped onto the virtual object by texel interpolation method.

15. The program as defined in claim 12,
wherein the alternative second depth value is clamped into a given value depending on a bit value other than the bits I to J in the depth value.

16. The program as defined in claim 12,
wherein the depth value is set as an index number in a lookup table for index color texture-mapping; and wherein the depth value is transformed into the second depth value or the alternative second depth value by performing index color texture-mapping on a virtual object by using the lookup table.

17. The program as defined in claim 12, wherein:
bits M to N in the depth value are set as an index number in a first lookup table for index color texture-mapping;

the depth value is transformed into a third depth value by performing index color texture-mapping on a virtual object by using the first lookup table;

bits K to L (where K≧I≧L>M≧J≧N) in the depth value are set as an index number in a second lookup table for index color texture-mapping;

the depth value is transformed into a fourth depth value by performing index color texture-mapping on a virtual object by using the second lookup table; and the third and fourth depth values are used to determine the second depth value or the alternative second depth value.

18. A computer-usable program embodied on an information storage medium or in a computer-executable signal capable of being transmitted by a transmitter and received by a receiver to generate an electronic image on a display screen, comprising a processing routine for a computer to realize:

means which sets bits M to N in given image information as an index number in a first lookup table for index color texture-mapping, and uses the first lookup table to perform index color texture-mapping on a virtual object to transform the image information into third image information;

means which sets bits K to L in the image information as an index number in a second lookup table for index color texture-mapping, and uses the second lookup table to perform index color texture-mapping on a virtual object to transform the image information into fourth image information; and means which transforms the image information into second image information or alternative second image information formed of the bits I to J (where K≧I≧L>M≧J≧N) in the image information based on the third and fourth image information, wherein, when a depth value, which is one of the image information, is within a predetermined range, the image information is transformed into the second image information and, when a depth value, which is one of the image information, is outside of the predetermined range, the image information is transformed into the alternative second image information, the predetermined range includes a depth value of a focus position of a virtual camera, and a number of threshold steps of the second image information is greater than a number of threshold steps of the alternative second image information.

19. The program as defined in claim 16,
wherein the virtual object is a polygon having a size equal to a size of a display screen.

20. The program as defined in claim 18,
wherein the virtual object is a polygon having a size equal to a size of a display screen.

21. The game system as defined in claim 16,
wherein the virtual object is a polygon having a size equal to a size of a block obtained by dividing a display screen into blocks.

22. The program as defined in claim 18,
wherein the virtual object is a polygon having a size equal to a size of a block obtained by dividing a display screen into blocks.

23. A method of generating an electronic image to provide more realistic view on a display screen, comprising a step of:
transforming a depth value, comprising a plurality bits, of each pixel of an original image into a second depth value, or an alternative second depth value, both being formed of the lower bits I to J of the depth value which are positioned lower than a most significant bit of the depth value;
setting an alpha value of each pixel to a value corresponding to the second depth value or the alternative second depth value;
generating the electronic image based on the set alpha value, wherein the bits I to J are an intermediate set of bits, and are below the uppermost bit and above the lowermost bit of the depth value,
wherein, when the depth value is within a predetermined range, the depth value is transformed into the second depth value, and, when the depth value is outside of the predetermined range, the depth value is transformed into the alternative second depth value,
the predetermined range includes a depth value of a focus position of a virtual camera, and
a number of threshold steps of the second depth value is greater than a number of threshold steps of the alternative second depth value.

24. The method as defined in claim 23,
wherein the original image is blended with a defocused image of the original image based on the alpha value set for each pixel.

25. The method as defined in claim 24,
wherein the defocused image of the original image is generated by setting the original image as a texture and shifting texture coordinates of a virtual object when the texture is mapped onto the virtual object by texel interpolation method.

26. The method as defined in claim 23,
wherein the alternative second depth value is clamped into a given value depending on a bit value other than the bits I to J in the depth value.

27. The method as defined in claim 23,
wherein the depth value is set as an index number in a lookup table for index color texture-mapping; and
wherein the depth value is transformed into the second depth value or the alternative second depth value by performing index color texture-mapping on a virtual object by using the lookup table.

28. The method as defined in claim 23, wherein:
bits M to N in the depth value are set as an index number in a first lookup table for index color texture-mapping;
the depth value is transformed into a third depth value by performing index color texture-mapping on a virtual object by using the first lookup table;
bits K to L (where K≧I≧L>M≧J≧N) in the depth value are set as an index number in a second lookup table for index color texture-mapping;
the depth value is transformed into a fourth depth value by performing index color texture-mapping on a virtual object by using the second lookup table; and
the third and fourth depth values are used to determine the second depth value or the alternative second depth value.

29. A method of generating an electronic image to provide more realistic view on a display screen, comprising a step of:
setting bits M to N in given image information as an index number in a first lookup table for index color texture-mapping;
using the first lookup table to perform index color texture-mapping on a virtual object to transform the image information into third image information;
setting bits K to L in the image information as an index number in a second lookup table for index color texture-mapping;
using the second lookup table to perform index color texture-mapping on a virtual object to transform the image information into fourth image information; and
means which transforms the image information into second image information or alternative second image information formed of the bits I to J (where K≧I≧L>M≧J≧N) in the image information based on the third and fourth image information;
wherein, when a depth value, which is one of the image information, is within a predetermined range, the image information is transformed into the second image information and, when a depth value, which is one of the image information, is outside of the predetermined range, the image information is transformed into the alternative second image information,
the predetermined range includes a depth value of a focus position of a virtual camera, and
a number of threshold steps of the second image information is greater than a number of threshold steps of the alternative second image information.

30. The method as defined in claim 27,
wherein the virtual object is a polygon having a size equal to a size of the display screen.

31. The method as defined in claim 29,
wherein the virtual object is a polygon having a size equal to a size of the display screen.

32. The method as defined in claim 27,
wherein the virtual object is a polygon having a size equal to a size of a block obtained by dividing the display screen into blocks.

33. The method as defined in claim 29,
wherein the virtual object is a polygon having a size equal to a size of a block obtained by dividing the display screen into blocks.

* * * * *